US009006345B2

(12) United States Patent
Lancaster et al.

(10) Patent No.: US 9,006,345 B2
(45) Date of Patent: Apr. 14, 2015

(54) HETEROTRIFUNCTIONAL MOLECULES AND METHODS FOR THE SYNTHESIS OF DENDRIMERIC MATERIALS

(75) Inventors: Jeffrey Lancaster, New York, NY (US); Jeffrey T. Koberstein, Storrs, CT (US); Nicholas J. Turro, Tenafly, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/429,704

(22) Filed: Mar. 26, 2012

(65) Prior Publication Data

US 2012/0264881 A1 Oct. 18, 2012

Related U.S. Application Data

(60) Provisional application No. 61/467,573, filed on Mar. 25, 2011.

(51) Int. Cl.
*C08F 281/00* (2006.01)
*C08F 2/38* (2006.01)
*C08G 83/00* (2006.01)

(52) U.S. Cl.
CPC ............... *C08F 2/38* (2013.01); *C08F 2438/01* (2013.01); *C08G 83/003* (2013.01)

(58) Field of Classification Search
CPC ...... C07D 249/04; C08G 73/00; C08G 73/08; C08G 83/003; C08G 83/005; C08G 2261/1642; C08G 2261/1644; C08G 2261/17; C08G 2261/34; C08G 2261/354; C08G 2261/42; C08G 2261/46
USPC ........................... 525/242, 275, 293; 548/255
See application file for complete search history.

(56) References Cited

U.S. PATENT DOCUMENTS

| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 5,502,246 A | 3/1996 | Sucholeiki |
| 5,626,863 A | 5/1997 | Hubbell et al. |
| 5,646,302 A | 7/1997 | Barner et al. |
| 5,844,016 A | 12/1998 | Sawhney et al. |
| 5,858,653 A | 1/1999 | Duran et al. |
| 6,051,248 A | 4/2000 | Sawhney et al. |
| 6,153,211 A | 11/2000 | Hubbell et al. |
| 6,201,065 B1 | 3/2001 | Pathak et al. |
| 6,201,072 B1 | 3/2001 | Rathi et al. |
| 6,465,178 B2 | 10/2002 | Chappa et al. |
| 2003/0078314 A1 | 4/2003 | Johnson et al. |
| 2003/0096301 A1 | 5/2003 | Guo |
| 2003/0113792 A1 | 6/2003 | Swan et al. |
| 2003/0153001 A1 | 8/2003 | Soane et al. |
| 2003/0215801 A1 | 11/2003 | Pieken et al. |
| 2004/0209317 A1 | 10/2004 | Ting |
| 2004/0234788 A1 | 11/2004 | Li et al. |
| 2005/0032081 A1 | 2/2005 | Ju et al. |
| 2005/0208428 A1 | 9/2005 | Kawamura et al. |
| 2007/0020620 A1 | 1/2007 | Finn et al. |
| 2008/0051571 A1 | 2/2008 | Sekine et al. |
| 2008/0207887 A1 | 8/2008 | Lukhtanov et al. |
| 2009/0054619 A1* | 2/2009 | Baker et al. .................... 528/354 |
| 2009/0111775 A1 | 4/2009 | Li |
| 2010/0331441 A1* | 12/2010 | Lancaster et al. ............. 522/116 |
| 2012/0021200 A1* | 1/2012 | Koberstein et al. ........... 428/220 |
| 2012/0264881 A1 | 10/2012 | Lancaster et al. |

FOREIGN PATENT DOCUMENTS

WO WO-2010/053993 5/2010

OTHER PUBLICATIONS

Merrifield, R. B., "Solid Phase Peptide Synthesis. I. The Synthesis of a Tetrapeptide", J. Am. Chem. Soc., Jul. 20, 1963, vol. 85, pp. 2149-2154.
Orth, Ronald, et al., "A Photolabile Linker for the Mild and Selective Cleavage of Enriched Biomolecules from Solid Support", J. Org. Chem., 2009, vol. 74, No. 21, pp. 8476-8479.
Falsey, James R., et al., "Peptide and Small Molecule Microarray for High Throughput Cell Adhesion and Functional Assays", Bionconjugate Chem., 2001, vol. 12, pp. 346-353.
Letsinger, R. L., et al., "Reactions on Polymer Supports", Organic and Biological Chemistry, J. Am. Chem. Soc., Dec. 5, 1964, vol. 86, pp. 5163-5165.
Yang, Li, et al., "A Photocleavable and Mass Spectrometry Identifiable Cross-Linker for Protein Interaction Studies", Anal. Chem., 2010, vol. 82, pp. 3556-3566.
Fodor, Stephen P. A., et al., "Light-Directed, Spatially Addressable Parallel Chemical Synthesis", Science, Feb. 15, 1991, vol. 251, pp. 767-773.
Pease, Ann Caviani, et al., "Light-generated oligonucleotide arrays for rapid DNAsequence analysis", Proc. Natl. Acad. Sci. USA, May 1994, vol. 91, pp. 5022-5026.
Singh-Gasson, Sangeet, et al., "Maskless fabrication of light-directed oligonucleotide microarrays using a digital micromirror array", Nature Biotechnology, Oct. 1999, vol. 17, pp. 974-978.
Hartmann, Laura, et al., "Solid-Phase Supported Polymer Synthesis of Sequence-Defined, Multifunctional Poly(amidoamines)", Biomacromolecules, Apr. 2006, vol. 7, pp. 1239-1244.
MacBeath, Gavin, et al., "Printing Proteins as Microarrays for High-Throughput Function Determination", Science, Sep. 8, 2000, vol. 289, No. 5485, pp. 1760-1763.
Rusmini, Federica, et al., "Protein Immobilization Strategies for Protein Biochips", Biomacromolecules, Jun. 2007, vol. 8, No. 6, pp. 1775-1789.

(Continued)

*Primary Examiner* — Robert Jones, Jr.
(74) *Attorney, Agent, or Firm* — Wilmer Cutler Pickering Hale and Dorr LLP

(57) ABSTRACT

In one aspect, the present invention is directed to dendrimers comprised of macromolecules and trifunctional branches. In another aspect, the invention relates to methods for generating dendrimeric compositions comprising macromolecules and trifunctional branches. In certain embodiments, the radial density of the dendrimeric composition is controlled by selective incorporation of branches.

20 Claims, 24 Drawing Sheets

(56) References Cited

OTHER PUBLICATIONS

Panicker, Resmi C., et al., "Recent Advances in Peptide-Based Microarray Technologies", Combinatorial Chemistry & High Throughput Screening, 2004, vol. 7, pp. 547-556.
Mei, Ying, et al., "Solid-Phase ATRP Synthesis of Peptide-Polymer Hybrids", J. Am. Chem. Soc., Mar. 24, 2004, vol. 126, No. 11, pp. 3472-3476.
Moses, John E., et al., "The growing applications of click chemistry", Chem. Soc. Rev., Aug. 2007, vol. 36, No. 8, pp. 1249-1262.
Dondoni, Alessandro, "The Emergence of Thiol-Ene Coupling as a Click Process for Materials and Bioogranic Chemistry", Angew. Chem., 2008, vol. 47, pp. 8995-8997.
Hawker, Craig J., "The Convergence of Synthetic Organic and Polymer Chemistries", Science, Aug. 19, 2005, vol. 309, No. 5738, pp. 1200-1205.
Laibinis, Paul E., et al., "Comparison of the Structures and Wetting Properties of Self-Assembled Monolayers of $n$-Alkanethiols on the Coinage Metal Surfaces, Cu, Ag, Au$^{1}$", J. Am. Chem. Soc., 1991, vol. 113, pp. 7152-7167.
Johnson, Jeremiah A., et al., "Core-Clickable PEG-*Branch*-Azide Bivalent-Bottle-Brush Polymers by ROMP: Grafting-Through and Clicking-To", J. Am. Chem. Soc., 2011, vol. 133, No. 3, pp. 559-566.
Senaratne, Wageesha, et al., "Self-Assembled Monolayers and Polymer Brushes in Biotechnology: Current Applications and Future Perspectives", Biomacromolecules, 2005, vol. 6, No. 5, pp. 2427-2448.
Wang, Jin-Shan, et al., "Controlled/"Living" Radical Polymerization. Halogen Atom Transfer Radical Polymerization Promoted by a Cu(I)/Cu(II) Redox Process", Macromolecules, 1995, vol. 28, No. 23, pp. 7901-7910.
Johnson, Jeremiah A., et al., "Synthesis of Photocleavable Linear Macromonomers by ATRP and Star Macromonomers by a Tandem ATRP-Click Reaction: Precursors to Photodegradable Model Networks", Macromolecules, 2007, vol. 40, No. 10, pp. 3589-3598.
Antoni, Per, et al., "Pushing the Limits for Thiol-Ene and CuAAC Reactions: Synthesis of a 6th Generation Dendrimer in a Single Day", Macromolecules, 2010, vol. 43, pp. 6625-6631.
Rengifo, Hernan R., et al., ""Click-Functional" Block Copolymers Provide Precise Surface Functionality via Spin Coating", Langmuir, 2008, vol. 24, pp. 7450-7456.
Chen, Lu, et al., "Spin-On End-Functional Diblock Copolymers for Quantitative DNA Immobilization", Biomacromolecules, 2008, vol. 9, pp. 2345-2352.
Lvov, Yuri, et al., "Combination of Polycation/Polyanion Self-Assembly and Langmuir-Blodgett Transfer for the Construction of Superlattice Films", J. Phys. Chem., 1993, vol. 97, pp. 13773-13777.
Lvov, Yuri, et al., "Formation of Ultrathin Multilayer and Hydrated Gel from Montmorillonite and Linear Polycations", Langmuir, 1996, vol. 12, pp. 3038-3044.
Cooper, Thomas M., et al., "Formation of Polypeptide-Dye Multilayers by an Electrostatic Self-Assembly Technique", Langmuir, 1995, vol. 11, pp. 2713-2718.
Locklin, Jason, et al., "Nanostructured Ultrathin Films of Water-Soluble Sexithiophene Bolaform Amphiphiles Prepared by Layer-by-Layer Self-Assembly", Langmuir, 2002, vol. 18, pp. 877-883.
Zhang, Xi, et al., "Layer-by-layer assembly: from convention to unconventional methods", Chem. Commun., Apr. 14, 2007, No. 14, pp. 1395-1405.
Sukhorukov, Gleb B., et al., "Layer-by-layer self assembly of polyelectrolytes on colloidal particles", Colloids and Surfaces A: Physicochemical and Engineering Aspects, 1998, vol. 137, pp. 253-266.
Lvov, Yuri, et al., "Biocolloids with Ordered Urease Multilayer Shells as Enzymatic Reactors", Anal. Chem., 2001, vol. 73, pp. 4212-4217.
Crisp, M. Todd, et al., "Preparation of Nanoparticle Coatings on Surfaces of Complex Geometry", Nano Letters, 2003, vol. 3, No. 2, pp. 173-177.
Lvov, Yuri, et al., "Assembly of Thin Films by Means of Successive Deposition of Alternate Layers of DNA and Poly(allylamine)", Macromolecules, 1993, vol. 26, pp. 5396-5399.
Onda, Mitsuhiko, et al., "Sequential Actions of Glucose Oxidase and Peroxidase in Molecular Films Assembled by Layer-by-Layer Alternate Adsorption", Biotechnology and Bioengineering, 1996, vol. 51, pp. 163-167.
Caruso, Frank, et al., "Enzyme Multilayers on Colloid Particles: Assembly, Stability, and Enzymatic Activity", Langmuir, 2000, vol. 16, pp. 9595-9603.
Schüler, Corinna, et al., "Decomposable Hollow Biopolymer-Based Capsules", Biomacromolecules, 2001, vol. 2, pp. 921-926.
Cortez, Christina, et al., "Targeting and Uptake of Multilayered Particles to Colorectal Cancer Cells", Advanced Materials, 2006, vol. 18, pp. 1998-2003.
Dach, Benjamin I., et al., "Cross-Linked "Matrix-Free" Nanocomposites from Reactive Polymer-Silica Hybrid Nanoparticles", Macromolecules, 2010, vol. 43, pp. 6549-6552.
Piggott, Andrew M., et al., "Synthesis of a new hydrophilic $o$-nitrobenzyl photocleavable linker suitable for use in chemical proteomics", Tetrahedron Letters, 2005, vol. 46, pp. 8241-8244.
Guillier, Fabrice, et al., "Linkers and Cleavage Strategies in Solid-Phase Organic Synthesis and Combinatorial Chemistry", Chem. Rev., 2000, vol. 100, pp. 2091-2157.
International Search Report for PCT/US09/63282, dated Jan. 11, 2010, 2 pages.
Bates, G. H. Frederickson, "Block Copolymers—Designer Soft Materials," Physics Today 52, 32-38 (1999).
Binder et al., "'Click' Chemistry in Polymer and Materials Science," Macromol. Rapid. Comm., vol. 28, pp. 15-54 (2007).
Collman et al., "Mixed Azide-Terminated Monolayers: A Platform for Modifying Electrode Surfaces," Langmuir, vol. 22, pp. 2457-2464 (Mar. 14, 2006).
Collman et al.,""Clicking" Functionality onto Electrode Surfaces," Langmuir, vol. 20, pp. 1051-1053 (Feb. 17, 2004).
De Greest et al., "Degradable Multilayer Films and Hollow Capsules via a 'Click' Strategy," Macromo. Rapid. Comm, vol. 29, pp. 1111-1118 (2008).
Decher et al., "Builup of Ultrthin mutlilayer films by a self-assmebly process, 1 consecutive absorption of anionic and cationic bipolar amphiphiles on chargd surfaces," Macromol. Chem., Macromol. Symp. 46, 321-327 (1991).
Devaraj et al., "Chemoselective Covalent Coupling of Oligonucleotide Probes to Self-Assembled Monolayers," J. Am Chem Soc., vol. 127, pp. 8600-8601 (Jun. 22, 2005).
G. Decher, Fuzzy Nanoassemblies: Toward Layered Polymeric Multicomposites ,Science 277, 1232-1237 (1997).
Heller M.J., "DNA Microarray Technology: Devices, Systems, and Applications," Annu. Rev. Biomed Eng. , vol. 4, pp. 129-153 (2002).
Huang et al., "Effect of Segmental Adsorption on the Tethering of End-Functionalized Polymer Chains," Macromolecules, vol. 37, pp. 516-523 (2004).
Huang et al., "Formation of a Tetra-σ-Bonded Intermediate in Acetylethyne Binding on Si(100)–2×1," Langmuir, vol. 21, pp. 3384-3388 (Apr. 12, 2005).
J.M. Levösalmi, T.J. McCarthy,"Poly(4-methyl-1-pentene) supported polyelectrolyte multilayer films: preparation and gas permeability.", Macromolecules, vol. 30, pp. 1752-1757 (1997).
J.W. Baur, S. Kim, P.B. Balanda, J.R. Reynolds, M.F. Rubner, "Thin-film light-emitting devices based on sequentially adsorbed multilayers of water-solublepoly-(p-phenylene)s.", Adv Mater, vol. 10, pp. 1452-1455 (1998).
Jalbert et al., "End Group Effects on Surface Properties of Polymers: Semiempirical Calculations and Comparison to Experimental Surface Tensions for α,ω-Functional Poly(dimethylsiloxanes)," Macromolecules, vol. 30, pp. 4481-4490 (1997).
Johnson et al., "Construction of Linear Polymers, Dendrimers, Networks, and Other Polymeric Architectures by Copper-Catalyzed Azide-Alkyne Cycloaddition "Click" Chemistry," Macromol. Rapid Comm, vol. 1052-1072 (2008).
Jones et al., Factors affecting the preparation of permanently end-grafted polystyrene layers, Polymer, vol. 40, pp. 525-530 (1999).
Karim et al., "Self-Organization of Polymer Brush Layers in a Poor Solvent," J. Phys. II, pp. 1441-1456 (1995).
Kolb et al., "Click Chemistry: Diverse Chemical Function from a Few Good Reactions," Angew. Chem., vol. 40, pp. 2005-2021 (2001).

(56) References Cited

OTHER PUBLICATIONS

L. Wang, Y. Fu, Zh. Wang, Y. Fan, X. Zhang, "Investigation into an alternating multilayer film of poly(4-vinylpyridine) and poly(acrylic acid) based on hydrogen bonding.", Langmuir, vol. 15, pp. 1360-1363 (1999).

Lee et al., "Reactivity of Acetylenyl-Terminated Self-Assembled Monolayers on Gold: Triazole Formation," Langmuir, vol. 20, pp. 3844-3847 (May 11, 2004).

Liang et al., "Covalent Layer-by-Layer Assembly of Conjugated Polymers and CdSe Nanoparticles: Multilayer Structure and Photovoltaic Properties," Adv. Funct. Mater., vol. 16, pp. 542-548 (2006).

Ligoure et al., "Thermodynamics and kinetics of grafting end-functionalized polymers to an interface," J. Phys. (Paris), vol. 51, pp. 1313-1328 (1990).

Luzinov et al., "Polystyrene Layers Grafted to Epoxy-Modified Silicon Surfaces," Macromolecules, vol. 33, pp. 1043-1048 (2000).

M. Wells, D. L. Dermody, H. C. Yang, T. Kim, R. M. Crooks, and A. J. Ricco, "Interactions Between Organized, Surface-Confined Monolayers and Vapor-phase Probe Molecules. 9. Structure/Reactivity Relationship Between Three Surface-Confined Isomers of Mercaptobenzoic Acid and Vapor-phase Decylamine", Langmuir, 12, 1989-1996 (1996).

Netzer et al., "A new approach to construction of artificial monolayer assemblies," J. Am. Chem Soc., vol. 105, pp. 674-676 (1983).

S. A. Sukhishvili, and S. Granick, "Layered, erasable polymer multilayers formed by hydrogen-bonded sequential self-assembly.", Macromolecules, vol. 35, pp. 301-310 (2002).

Seo et al., "Click Chemistry to Construct Fluorescent Oligonucleotides for DNA Sequencing," J. Org. Chem., vol. 68, pp. 609-612 (2003).

Seo et al., "Photocleavable fluorescent nucleotides for DNA sequencing on a chip constructed by site-specific coupling chemistry," roc. Natl. Acad. Sci USA, vol. 101, pp. 5488-5493 (Apr. 13, 2004).

Stroock, Abraham D. et al., "Synthesis of Free-Standing Quasi-Two-Dimensional Polymers," *Langmuir*, 2003, 2466-2472, vol. 19:6.

Such et al., "Assembly of Ultrathin Polymer Multilayer Films by Click Chemistry," J. Am. Chem. Soc., vol. 128, pp. 9318-9319 (2006).

Sun et al., "Carbohydrate and Protein Immobilization onto Solid Surfaces by Sequential Diels-Alder and Azide-Alkyne Cycloadditions," Bioconjug Chem., vol. 17, pp. 52-57 (2006).

Ulman A., "Formation and Structure of Self-Assembled Monolayers," Chem Rev., vol. 96, pp. 1533-1554 (1996).

Urbani et al, "Self-Assembly of Amphiphilic Polymeric Dendrimers Synthesized with Selective Degradable Linkages," Macromolecules, vol. 41, pp. 76-86 (2008).

Vestberg et al., "Role of architecture and molecular weight in the formation of tailor-made ultrathin multilayers using dendritic macromolecules and click chemistry," J. Polym Sci. Polym Chem., pp. 2835-2846 (2007).

White et al., "Toward the Syntheses of Universal Ligands for Metal Oxide Surfaces: Controlling Surface Functionality through Click Chemistry," J. Am. Chem. Soc., vol. 128, pp. 11356-11357 (2006).

Zhang et al., Carbohydrate-Protein Interactions by "Clicked" Carbohydrate Self-Assembled Monolayers, Anal Chem, vol. 78, pp. 2001-2008 (Mar. 15, 2006).

Krivopalov, et al., "1,2,3-Triazole and its derivatives. Development of methods for the formation of the triazile ring,", *Russ. Chem. Rev.* 74, 339-379 (2005).

Amit et al., "Photosensitive Protecting Groups of Amino Sugars and Their Use in Glycoside Synthesis. 2-Nitrobenzyloxycarbonylamino and 6-Nitroveratryloxycarbonylamino Derivatives," J. Org. Chem., vol. 39, No. 2, pp. 192-196 (1974).

Aucagne et al., "Chemoselective Formation of Successive Triazole Linkages in One Pot: 'Click-Click' Chemistry," Org. Lett, vol. 8, pp. 4505-4507 (2006).

Gordon Conference on Adhesion at Colby—Sawyer College in new Hampshire from Jul. 26-Jul. 31, 2009—poster presentation by Benjamin Dach from Columbia University, 1 page.

International Search Report mailed on Jan. 11, 2010, for International Patent Application No. PCT/US09/63282 filed Nov. 4, 2009, 4 pages.

Written Opinion mailed on Jan. 11, 2010, for International Patent Application No. PCT/US09?63282 filed Nov. 4, 2009, 5 pages.

Office Action issued by the United States Patent and Trademark Office for U.S. Appl. No. 13/572,963 dated for Mar. 28, 2014 (100 pages).

Office Action issued by the United States Patent and Trademark Office for U.S. Appl. No. 13/127,683 dated for Jul. 15, 2013 (75 pages).

Office Action issued by the United States Patent and Trademark Office for U.S. Appl. No. 13/127,683 dated for Feb. 25, 2014 (55 pages).

Opsteen, J.A. et al., "Modular Synthesis of ABC Type Block Copolymers by "Click" Chemistry," Journal of Polymer Science: Part A, Polymer Chemistry, vol. 45, pp. 2913-2924 (2007).

Slater, M. et al., ""Click Chemistry" in the Preparation of Porous Polymer-Based Particulate Stationary Phases for µ-HPLC Separation of Peptides and Proteins," Anal. Chem., vol. 78, pp. 4969-4975 (2006).

\* cited by examiner

| GENERATION | COMBINATIONS | EXAMPLES | |
|---|---|---|---|
| FIRST 'GENERATION' DENDRIMERS | $C_2B$ | $C_2B$ |  |
| | $C_2M$ | $C_2M$ |  |
| SECOND 'GENERATION' DENDRIMERS | $C_2BB$ | $C_2BB$ |  |
| | $C_2BM$ | | |
| | $C_2MB$ | $C_2MM$ |  |
| | $C_2MM$ | | |
| THIRD 'GENERATION' DENDRIMERS | $C_2BBB$ | | |
| | $C_2BBM$ | $C_2BBM$ | 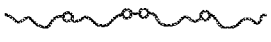 |
| | $C_2BMB$ | | |
| | $C_2BMM$ | | |
| | $C_2MBB$ | | |
| | $C_2MBM$ | $C_2MBM$ | 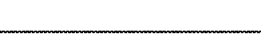 |
| | $C_2MMB$ | | |
| | $C_2MMM$ | | |
| FOURTH 'GENERATION' DENDRIMERS | $C_2BBBB$ | | |
| | $C_2BBBM$ | | |
| | $C_2BBMB$ | $C_2BBMM$ | 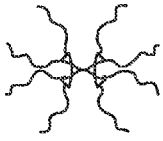 |
| | $C_2BBMM$ | | |
| | $C_2BMBB$ | | |
| | $C_2BMBM$ | | |
| | $C_2BMMB$ | $C_2BMBM$ | 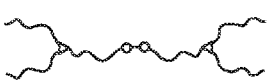 |
| | $C_2BMMM$ | | |
| | $C_2MBBB$ | | |
| | $C_2MBBM$ | | |
| | $C_2MBMB$ | $C_2MBMM$ |  |
| | $C_2MBMM$ | | |
| | $C_2MMBB$ | | |
| | $C_2MMBM$ | $C_2MMBM$ |  |
| | $C_2MMMB$ | | |
| | $C_2MMMM$ | | |

FIG. 22

HETEROTRIFUNCTIONAL MOLECULES AND METHODS FOR THE SYNTHESIS OF DENDRIMERIC MATERIALS

This application claims priority to U.S. Provisional Application No. 61/467,573, filed Mar. 25, 2011, which is incorporated herein by reference.

This invention was made with government support under grants CHE 07-17518, IGERT 02-21589 and GK12 07-42450 LEEFS awarded by the National Science Foundation. The government has certain rights in the invention.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

BACKGROUND OF THE INVENTION

Dendrimers are highly branched organic macromolecules, typically grown or generated from monomeric building blocks in a divergent, stepwise process. Upon each iterative generation, increased branching is introduced which leads to a large number of termini each containing a functional group. Ultimately, the resultant dendrimers exhibit a regular radial pattern of increasing molecular density. Ongoing challenges in the synthesis of dendrimeric molecules have been the development of a general approach to fully functionalize the termini of higher generation dendrimers, efforts to control growth of the dendrimer, the synthesis of higher generation dendrimers, and the synthesis of high molecular weight dendrimeric structures.

SUMMARY OF THE INVENTION

In one aspect, the invention is comprised of a dendrimer comprising an n-functional core covalently linked to n first heterobifunctional macromolecules M1 or n first heterotrifunctional branches B1, a surface layer comprising a surface heterobifunctional macromolecule or a heterotrifunctional branch, and a desired number of heterotrifunctional branches between the surface layer and core, and wherein each n is independently an integer from 1-100. In one embodiment, the density of the macromolecule at a radial distance from the core is controlled by selective incorporation of branches. In another embodiment, the dendrimer further comprises a second heterobifunctional macromolecule M2 or a second heterotrifunctional branch B2 covalently linked to M1 or B1. In another embodiment, the dendrimer further comprises a third heterobifunctional macromolecule M3 or a third heterotrifunctional branch B3 covalently linked to M2 or M2.

In another aspect, the methods described herein relate to a method for generating a dendrimeric composition, the method comprising: (a) covalently linking a core with a first heterobifunctional macromolecule or a first heterotrifunctional branch, wherein said heterobifunctional macromolecule or heterotrifunctional branch is comprised of a first click moiety group and a first terminus, wherein said first terminus is comprised of a second click moiety group or a non-click functional group, and (b) covalently linking the heterobifunctional macromolecule or heterotrifunctional branch with a second heterobifunctional macromolecule or heterotrifunctional branch, wherein branching of the dendrimer is controlled by selective incorporation of heterotrifunctional branches. In one embodiment, the method further comprises a step comprising the step of repeating step (b) until a multilayer dendrimer having (i) a surface layer comprising a surface heterobifunctional macromolecule or heterotrifunctional branch, and (ii) a desired number of heterotrifunctional branches between the surface layer and the core is obtained. In another embodiment, the first heterobifunctional macromolecule or first heterotrifunctional branch is comprised of a thiol or a terminal alkene. In one embodiment, the first terminus is comprised of a second click moiety group. In another embodiment, the second click moiety group is protected, and method further comprises a step between step (a) and step (b) of deprotecting the protected second click moiety group to generate a second click moiety group. In one embodiment, the first terminus is comprised of a non-click functional group. In another embodiment, the methods further comprise conversion of the non-click functional group to a click moiety group. In one embodiment, the density of the macromolecule at a given radial distance from the core is controlled by selective incorporation of branch molecules.

In another aspect, the methods described herein relate to a method for generating a dendrimeric composition, the method comprising: (a) covalently linking a core with a first heterobifunctional macromolecule or a first heterotrifunctional branch, wherein said heterobifunctional macromolecule or heterotrifunctional branch is comprised of a first non-click functional group and a first click moiety group, and (b) covalently linking the heterobifunctional macromolecule or heterotrifunctional branch with a second heterobifunctional macromolecule or heterotrifunctional branch, wherein branching of the dendrimer is controlled by selective incorporation of heterotrifunctional branches. In one embodiment, the method further comprises a step comprising the step of repeating step (b) until a multilayer dendrimer having (i) a surface layer comprising a surface heterobifunctional macromolecule or heterotrifunctional branch, and (ii) a desired number of heterotrifunctional branches between the surface layer and the core is obtained. In another embodiment, the first heterobifunctional macromolecule or first heterotrifunctional branch is comprised of a thiol or a terminal alkene. In another embodiment, the click moiety group is protected, and method further comprises a step between step (a) and step (b) of deprotecting the protected click moiety group to generate a reactive click moiety group. In one embodiment, the density of the macromolecule at a given radial distance from the core is controlled by selective incorporation of branch molecules.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group, and (b) covalently linking the first molecule with a second molecule selected from a second heterobifunctional macromolecule M2 and a second heterotrifunctional branch B2, wherein the second molecule is comprised of a second click moiety and a first terminus selected from a non-click functional group and a protected third click moiety, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group, and (b) covalently linking the first molecule with a second molecule selected from a second heterobifunctional macromolecule M2 and a second heterotrifunctional branch B2, wherein the second molecule is comprised of a second click moiety and terminus comprised of a protected third click moiety or a non-click functional group, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group and a second click moiety group, and (b) covalently linking the first molecule with a second molecule selected from a second heterobifunctional macromolecule M2 and a second heterotrifunctional branch B2, wherein the second molecule is comprised of a third click moiety and a protected fourth click moiety, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In one embodiment, the first click moiety is an azide group and the protected second click moiety is a silyl alkyne group.

In one embodiment, the non-click functional group is converted to a click moiety group. In another embodiment, the non-click functional group is selected from the group consisting of an alcohol, a halogen, a leaving group such as an alkylsulfonate or an arylsulfonate, an ester or a silyl ether.

In one embodiment, the methods further comprise conversion of the non-click moiety functional group to a click moiety functional group.

In one embodiment, the branch is comprised of a plurality of protected second click moiety groups. In another embodiment, the branch is comprised of a terminus comprised of a non-click functional group.

In one embodiment, the macromolecule is comprised of a terminus comprised of a non-click functional group.

In another embodiment, the first click moiety group of the heterotrifunctional branch is a an azide group and at least two protected second click moiety groups of the heterotrifunctional branch are silyl alkyne groups.

In yet another embodiment, the first click moiety is an alkyne group and the second click moiety is an azide group.

In another embodiment, the first click moiety group of the heterotrifunctional branch is an alkyne group and at least two second click moiety groups of the heterotrifunctional molecule are azide groups.

In one embodiment, the core is n-functional, wherein n is an integer from 1-100.

In one embodiment, the macromolecule is comprised of a polymer.

In one embodiment, the macromolecule is comprised of a polymer unit of about 10-500 Daltons.

In another embodiment, the macromolecule is comprised of a silyl-alkyne-PS-$N_3$, silyl-alkyne-PtBA-$N_3$, silyl-alkyne-PnBA-$N_3$, or silyl-alkyne-PMMA-$N_3$ polymer.

BRIEF DESCRIPTION OF THE FIGURES

FIG. 22. A schematic illustration of methods of generating dendrimeric polymer compositions according some embodiments of the methods described herein. Representative first, second, third and fourth generation dendrimers are constructed from a bifunctional core ($C_2$) with branches (B) and macromolecules (M). Similar possibilities exist for a trifunctional ($C_3$) or n-functional ($C_n$) core. Incorporation of different macromolecules provides different architectures ($M_1$, $M_2$, etc.). Triangles indicate branches and circles indicate a covalent linkage between macromolecules or between a macromolecule and a core.

DETAILED DESCRIPTION OF THE INVENTION

Figure 1:
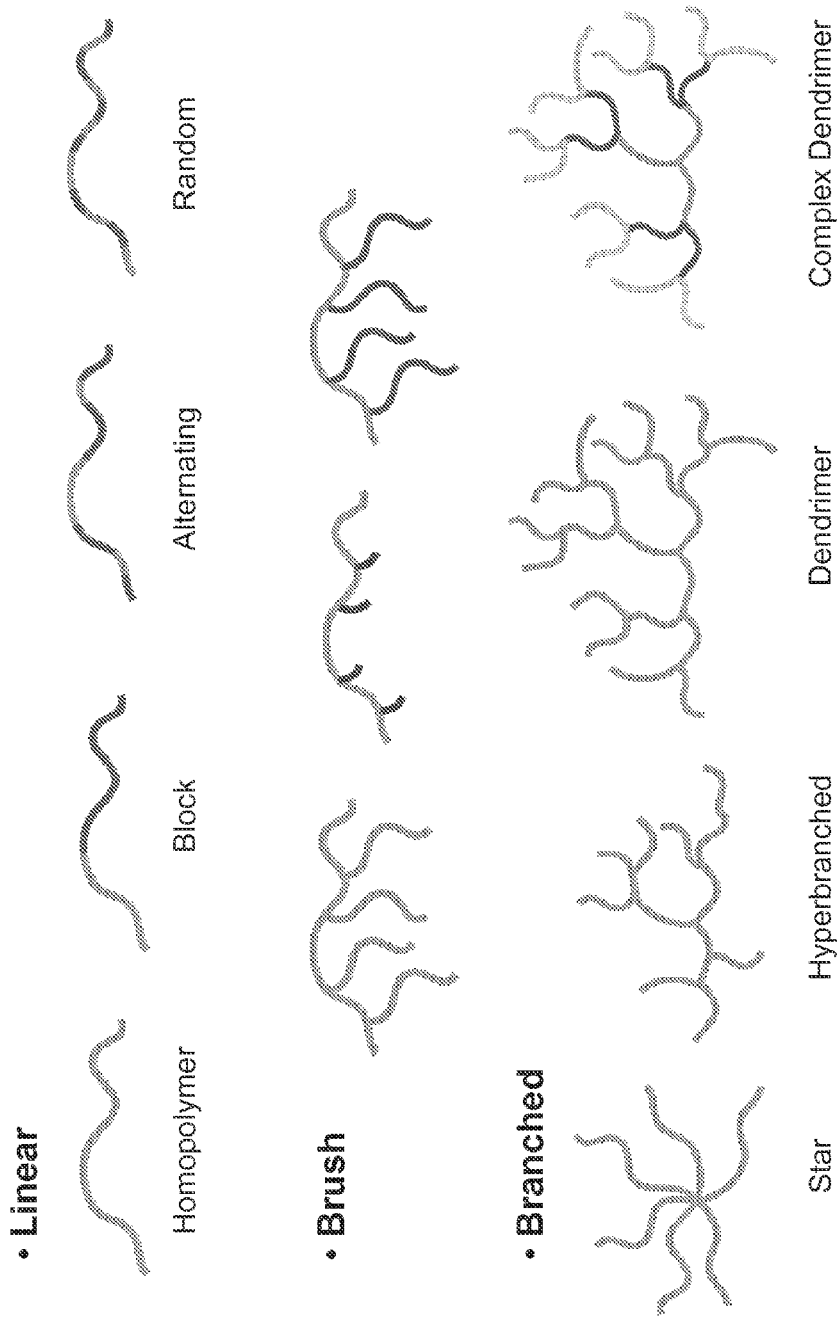
FIG. 1. Representative embodiments of polymer architectures such as a) linear, b) brush, and c) branched.

Described herein are methods and compositions useful for assembly of dendrimeric molecules. In certain embodiments, the methods comprise the preparation of selectively branched multilayer dendrimeric compositions. In certain embodiments, the methods described herein can also be used to prepare covalently bonded dendrimeric or polymeric compositions comprising at least one heterobifunctional macromolecule or at least one heterotrifunctional branch. Also described herein are methods and compositions for controlling radial density of one or more generations of a dendrimer comprising one or more branches deposited in any desired sequence.

Definitions

As used herein and in the appended claims, the singular forms "a," "an," and "the" include plural references unless the content clearly dictates otherwise.

The term "about" is used herein to mean approximately, in the region of, roughly, or around. When the term "about" is used in conjunction with a numerical range, it modifies that range by extending the boundaries above and below the numerical values set forth. The term "about" is used herein to modify a numerical value above and below the stated value by a variance of 20%.

As used herein, the term "click chemistry" refers to the use of chemical building blocks to drive a linkage reaction with appropriate complementary sites in other blocks. These chemical reactions (e.g., including, but not limited to, those between azide and alkyne groups) are specific and result in covalent linkage between the two molecules. Click chemistry can be used to drive selective modular, stereospecific coupling of molecules (Kolb, H. C., Finn, M. G., and Sharpless, K. B. *Angew. Chem. Int. Ed.* 2001, 40, 2004; Rostovtsev, V. V., Green, L. G., Fokin, V. V., Sharpless, K. B., *Angew. Chem. Int. Ed.* 2002, 41, 2596; Tornoe, C. W., Christensen, C., Meldal, M. *J. Org. Chem.* 2002, 67, 3057; Dondoni, A. *Angew. Chem. Int. Ed.* 2008, 47, 8995; each herein incorporated by reference in its entirety). Click chemistry can also be used to modify surfaces and surface properties (Moses, J. E. and Moorhouse, A. D., *Chem. Soc. Rev* 2007, 1249-1262; herein incorporated by reference in its entirety).

As used herein, the term "non-click functional group" refers to any chemical functional group that does not participate in a click chemistry reaction, particularly the click chemistry reaction being used to generate the dendrimeric structure. Thus, in embodiments wherein the click chemistry reaction is a 1,3-dipolar cycloaddition, the non-click functional groups may thus include any functional group other than an azide and an alkyne. Other embodiments of non-click functional groups will be dependent on the particular click reaction employed in the methods, and will be apparent to those skilled in the art. Examples of non-click functional groups include alcohols, halides (or halogens), activated alcohols such as alkyl- or aryl-sulfonates, esters and silyl ethers. Non-click functional groups may be converted into click functional groups by any means known in the art.

As used herein, the term "dendrimer" or "dendrimeric structure" refers to any poly-armed organic molecule, and can include dendrimers having defects in the branching structure, dendrimers having an incomplete degree of branching, crosslinked and uncrosslinked dendrimers, asymmetrically branched dendrimers, star polymers, highly branched polymers, highly branched copolymers and/or block copolymers of highly branched and not highly branched polymers. Examples of dendrimers include, but are not limited to poly(propyleneimine) (DAB) dendrimers, benzyl ether dendrimers, phenylacetylene dendrimers, carbosilane dendrimers, convergent dendrimers, polyamine, multi-armed PEG polyamide dendrimers as well as dendrimers described in U.S. Pat. Nos. 4,507,466, 4,558,120, 4,568,737 and 4,587,329, each of which of which are incorporated herein by reference in their entireties. Further exemplary dendrimers include those described in Dendritic Molecules, Concepts, Syntheses, Perspectives. Newkome, et al., VCH Publishers, Inc. New York, N.Y. (1996); herein incorporated by reference in its entirety.

Dendrimers are highly branched organic molecules, and are typically grown from monomeric building blocks in a step-wise or iterative process. In a typical divergent synthetic approach, a core molecule (for example one which contains 2-3 reactive groups) is reacted with new, branched monomers, each containing two or three new, latent functional handles. These new functional handles are in turn unveiled and reacted with yet more monomers, causing the dendrimer to grow exponentially with each generation. Each generation thus represents a new layer or shell on the dendrimeric structure. The result of multiple generations is a three-dimensional spherical polymer. While there are numerous examples of using branched monomers for dendrimer synthesis, none currently employs a branched macromolecule. Herein, an approach for the construction of complex polymer architectures is presented that takes advantage of complimentary building blocks that enable assembly in various configurations. In one embodiment, the invention provides for higher molecular weight macromolecules for the synthesis of high-molecular weight dendrimers. In one embodiment, the invention provides for dendrimer synthesis with macromolecules comprising protected functional groups to prevent uncontrolled growth of branched structures. The "click chemistry" techniques enable one to elaborate the dendrimer without disturbing other functional groups present and also ensures high yielding steps at each iteration of growth. The selection of branch points allows for control over the polymer density at some radial distance from the dendrimer core. Using click chemistry methods, heterobifunctional macromolecules and small molecules are assembled in a controlled manner to yield high molecular weight novel polymer structures. Protection of one reactive moiety on the building blocks allows selectivity for structural growth. In one embodiment, the methods described herein can be applied to functionalization of nanoparticles. In another embodiment, macromolecules and/or branches comprised of fluorene facilitate observation via fluorine NMR techniques. Dendrimeric structures are also versatile, and have been used in a variety of biomedical and industrial applications (Klajnert, B. et al., *Acta Biochemica Polonica* 2001, 48, 199; Hawker, et al. Macromolecules 2010, 43, 6625; PCT/US2009/063282; each herein incorporated by reference in its entirety).

Polymer architectures include linear sequences such as homopolymers, block polymers, alternating polymers and random polymers (FIG. 1). The sequence of monomers incorporated therein determines the classification and properties of polymers. Linear polymers (FIG. 1a) may have homo-functional or heterobifunctional end groups. Brush polymers (FIG. 1b) are another type of polymeric architecture, wherein polymer chains are grafted onto or from a different polymer chain, thus enabling various possibilities for sidechains, grafting density and the like. Branched polymers (FIG. 1c) offer an increasingly diverse and complex polymeric architecture, wherein the polymer chains are branched to provide structures such as star, hyperbranched, dendrimer and complex dendrimeric structures. Polymers can be "grown from" (divergent synthesis) or "attached to" (convergent synthesis) an organic core (for example, a small molecule) or a solid surface (for example, a nanoparticle). When synthesizing polymeric structures, it is desirable to generate as many geometries and architectures as possible using a similar set, or the same set, of small building blocks. It is also desirable to control the polymer architecture, molecular weight (dispersity), functionality and radial density and to incorporate functionality into the polymer using a unique construction approach.

In one aspect, the invention is comprised of a dendrimer comprising an n-functional core covalently linked to n first heterobifunctional macromolecules M1 or n first heterotrifunctional branches B1, a surface layer comprising a surface heterobifunctional macromolecule or a heterotrifunctional branch, and a desired number of heterotrifunctional branches between the surface layer and core, and wherein each n is independently an integer from 1-100. In one embodiment, the density of the macromolecule at a radial distance from the core is controlled by selective incorporation of branches. In another embodiment, the dendrimer further comprises a second heterobifunctional macromolecule M2 or a second heterotrifunctional branch B2 covalently linked to M1 or B1. In another embodiment, the dendrimer further comprises a third heterobifunctional macromolecule M3 or a third heterotrifunctional branch B3 covalently linked to M2 or M2.

In another aspect, the methods described herein relate to a method for generating a dendrimeric composition, the method comprising: (a) covalently linking a core with a first heterobifunctional macromolecule or a first heterotrifunctional branch, wherein said heterobifunctional macromolecule or heterotrifunctional branch is comprised of a first click moiety group and a first terminus, wherein said first terminus is comprised of a second click moiety group or a non-click functional group, and (b) covalently linking the heterobifunctional macromolecule or heterotrifunctional branch with a second heterobifunctional macromolecule or heterotrifunctional branch, wherein branching of the dendrimer is controlled by selective incorporation of heterotrifunctional branches. In one embodiment, the method further comprises a step comprising the step of repeating step (b) until a multilayer dendrimer having (i) a surface layer comprising a surface heterobifunctional macromolecule or heterotrifunctional branch, and (ii) a desired number of heterotrifunctional branches between the surface layer and the core is obtained. In another embodiment, the first heterobifunctional macromolecule or first heterotrifunctional branch is comprised of a thiol or a terminal alkene. In one embodiment, the first terminus is comprised of a second click moiety group. In another embodiment, the second click moiety group is protected, and method further comprises a step between step (a) and step (b) of deprotecting the protected second click moiety group to generate a second click moiety group. In one embodiment, the first terminus is comprised of a non-click functional group. In another embodiment, the methods further comprise conversion of the non-click functional group to a click moiety group. In one embodiment, the density of the macromolecule at a given radial distance from the core is controlled by selective incorporation of branch molecules.

In another aspect, the methods described herein relate to a method for generating a dendrimeric composition, the method comprising: (a) covalently linking a core with a first heterobifunctional macromolecule or a first heterotrifunctional branch, wherein said heterobifunctional macromolecule or heterotrifunctional branch is comprised of a first non-click functional group and a first click moiety group, and (b) covalently linking the heterobifunctional macromolecule or heterotrifunctional branch with a second heterobifunctional macromolecule or heterotrifunctional branch, wherein branching of the dendrimer is controlled by selective incorporation of heterotrifunctional branches. In one embodiment, the method further comprises a step comprising the step of repeating step (b) until a multilayer dendrimer having (i) a surface layer comprising a surface heterobifunctional macromolecule or heterotrifunctional branch, and (ii) a desired number of heterotrifunctional branches between the surface layer and the core is obtained. In another embodiment, the first heterobifunctional macromolecule or first heterotrifunctional branch is comprised of a thiol or a terminal alkene. In another embodiment, the click moiety group is protected, and method further comprises a step between step (a) and step (b) of deprotecting the protected click moiety group to generate a reactive click moiety group. In one embodiment, the density of the macromolecule at a given radial distance from the core is controlled by selective incorporation of branch molecules.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group, and (b) covalently linking the first molecule with a second molecule selected from a second heterobifunctional macromolecule M2 and a second heterotrifunctional branch B2, wherein the second molecule is comprised of a second click moiety and a first terminus selected from a non-click functional group and a protected third click moiety, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group, and (b) covalently linking the first molecule with a second molecule selected from a second heterobifunctional macromolecule M2 and a second heterotrifunctional branch B2, wherein the second molecule is comprised of a second click moiety and terminus comprised of a protected third click moiety or a non-click functional group, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In another aspect, the methods described herein relate to a method for generating a dendrimer, the method comprising: (a) covalently linking a core C with a first molecule selected from a first heterobifunctional macromolecule M1 and a first heterotrifunctional branch B1, wherein said macromolecule or branch is comprised of a first click moiety group and a second click moiety group, and (b) covalently linking the first molecule with a second molecule selected from a second heterobifunctional macromolecule M2 and a second heterotrifunctional branch B2, wherein the second molecule is comprised of a third click moiety and a protected fourth click moiety, wherein branching of the dendrimer is controlled by selective incorporation of heterotrifunctional branches. In one embodiment, the method further comprises the step of repeating step (b) until a multilayer dendrimer having (i) a surface layer comprising a surface heterobifunctional macromolecule or a heterotrifunctional branch, and (ii) a desired number of heterotrifunctional branches between the surface layer and the core is obtained.

In one embodiment, the macromolecules and branches comprise orthogonal functional groups. In one embodiment, the macromolecules comprise functional groups that are orthogonal to the functional groups of the branches. In one embodiment, the macromolecules comprise functional groups that are orthogonal to the functional groups of other macromolecules. In one embodiment, the branches comprise functional groups that are orthogonal to the functional groups of other branches.

In one embodiment, the first click moiety is an azide group and the protected second click moiety is a silyl alkyne group. In one embodiment, the click moiety is an azide, an alkene, an alkyne or a thiol. In one embodiment, the click moiety is an azide or an alkyne.

In one embodiment, the non-click functional group is converted to a click moiety group. In another embodiment, the non-click functional group is selected from the group consisting of an alcohol, a halogen, a leaving group such as an alkylsulfonate or an arylsulfonate, an ester or a silyl ether.

In one embodiment, the methods further comprise conversion of the non-click moiety functional group to a click moiety functional group.

In one embodiment, the branch is comprised of a plurality of protected second click moiety groups. In another embodiment, the branch is comprised of a terminus comprised of a non-click functional group.

In one embodiment, the macromolecule is comprised of a terminus comprised of a non-click functional group.

In another embodiment, the first click moiety group of the heterotrifunctional branch is a an azide group and at least two protected second click moiety groups of the heterotrifunctional branch are silyl alkyne groups.

In yet another embodiment, the first click moiety is an alkyne group and the second click moiety is an azide group.

In another embodiment, the first click moiety group of the heterotrifunctional branch is an alkyne group and at least two second click moiety groups of the heterotrifunctional molecule are azide groups.

In one embodiment, the core is n-functional, wherein n is an integer from 1-100.

In one embodiment, the macromolecule is comprised of a polymer.

In one embodiment, the macromolecule is comprised of a polymer unit of about 10-500 Daltons.

In another embodiment, the macromolecule is comprised of a silyl-alkyne-PS-N$_3$, silyl-alkyne-PtBA-N$_3$, silyl-alkyne-PnBA-N$_3$, or silyl-alkyne-PMMA-N$_3$ polymer.

In one embodiment, the non-click functional group is any functional group that does not react with a click moiety group. In one embodiment, the non-click functional group is converted to a click moiety group. In another embodiment, the non-click functional group is selected from the group consisting of an alcohol, a halogen, a leaving group such as an alkylsulfonate or an arylsulfonate, an ester or a silyl ether. In yet another embodiment, the non-click functional group is an alcohol, a halogen, an alkylsulfonate, an arylsulfonate, or a silyl ether. In yet another embodiment, the non-click functional group is an alcohol or a halogen. In still another embodiment, the halogen is selected from the group consisting of chlorine, bromine and iodine. In still another embodiment, the halogen is bromine or iodine. In yet another embodiment, the halogen is bromine.

In one embodiment, the non-click functional group is converted to an azide.

In one embodiment, the core is n-functional, wherein n is an integer from 1-100. In certain other embodiments, n is an integer from about 1 to about 5; from about 5 to about 10; from about 10 to about 20; from about 20 to about 30; from about 30 to about 40; from about 40 to about 50; from about 50 to about 60; from about 60 to about 70; from about 70 to about 80; from about 80 to about 90; from about 90 to about 100, where any stated values can form a lower and/or upper endpoint of a range as appropriate, or where any of the lower limits can be combined with any of the upper limits.

In one embodiment, the macromolecule is comprised of a polymer.

In one embodiment, the molecular weight of the macromolecule is about 10 to about 2,000,000 Daltons. In certain embodiments, the molecular weight of the macromolecules is about 10 to about 20 Da; about 20 to about 30 Da; about 30 to about 40 Da; about 40 to about 50 Da; about 50 to about 60 Da; about 60 to about 70 Da; about 70 to about 80 Da; about 80 to about 90 Da; about 90 to about 100 Da; or greater, where any stated values can form an upper and/or lower endpoint of a molecular weight range as appropriate or where any of the upper limits may be combined with any of the lower limits. Still other embodiments are discussed herein.

In one embodiment, the macromolecule is comprised of a monomer.

In one embodiment, the macromolecule is comprised of a monomer unit of about 10-500 Daltons.

In another embodiment, the macromolecule is a monomer comprised of a silyl-alkyne and an azide.

In one embodiment, the macromolecule is comprised of a thiol and a terminal alkene.

In another embodiment, the macromolecule is comprised of a thiol and a terminal azide.

In another embodiment, the macromolecule is comprised of a thiol and an alkyne. In another embodiment, the alkyne is a silyl-protected alkyne.

In another embodiment, the macromolecule is comprised of a non-click moiety functional group and a click moiety functional group. In still another embodiment, the macromolecule is comprised of halogen and an azide.

In one embodiment, the methods further comprise conversion of a non-click moiety functional group to a click moiety functional group. In another embodiment, the methods further comprise conversion of a halogen to an azide.

In one embodiment, the macromolecules described herein are terminated at one end with an azide group ($N_3$) and on the other end with an alkyne group such as, for example, trimethylsilyl alkyne (TMS-≡). In some embodiments of the methods, a 1,3-dipolar cycloaddition reaction takes place between the azide group moiety on a first macromolecule and the alkyne moiety of a second macromolecule to result in covalent attachment between the first macromolecule and the second macromolecule.

In one embodiment, the branches described herein may be organic molecules comprising at least three functional groups. In one embodiment, the branches comprise three functional groups. In one embodiment, the branch is comprised of three functional groups, where two are identical. In one embodiment, the branch is comprised of at least one protected functional group and at least one unprotected functional group. In another embodiment, the branch is comprised of at least one protected functional group. In some embodiments, the functional groups are at the termini of the branches. In some embodiments, the termini of the branches comprise a non-click functional group and two click functional groups. In some embodiments, the termini of the branches comprise two non-click functional groups and a click functional group. In some embodiments, the termini of the branches comprise two non-click functional groups and a protected click functional group. In some embodiments, the termini of the branches comprise two click functional groups and a protected non-click functional group. Exemplary embodiments of branches include, but are not limited to, those shown in FIG. 4. Further exemplary branches are those as described in WO 10/053,993 and references therein; each herein incorporated by reference in its entirety.

In one embodiment, the branch is comprised of an azide and two silylated alkyne groups.

In another embodiment, the branch is comprised of two azides and one silylated alkyne group.

In another embodiment, the branch is comprised of two alkene groups and an alkyne group.

In another embodiment, the branch is comprised of two alkyne groups and an alkene group.

In another embodiment, the branch is comprised of two thiol groups and a terminal alkyne.

Figure 2:
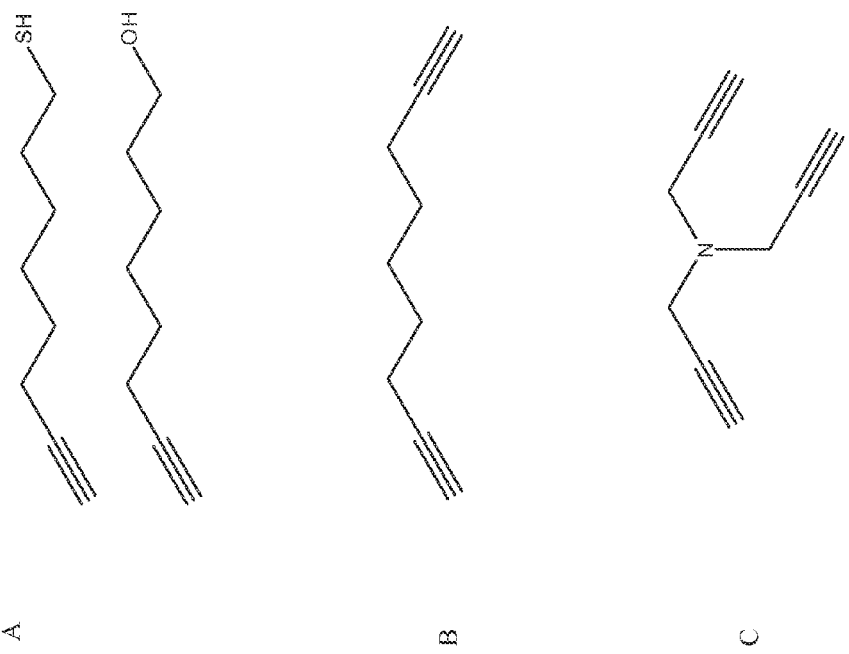
FIG. 2. a) Representative embodiments of a monofunctional core ($C_1$), b) a bifunctional core ($C_2$) and c) trifunctional core ($C_3$).

The core may be comprised of one or more functional groups on which to append the macromolecule or branch. The "n functional" core is thus comprised of n functional groups on which to append the macromolecule or branch, wherein n is an integer from 1-100 (FIG. 2). Thus, in one embodiment, the monofunctional or "1 functional" core is comprised of one functional group on which the macromolecule or branch is appended. In another embodiment, the bifunctional or "2 functional" core is comprised of two functional groups on which the macromolecule or branch is appended. In another embodiment, the trifunctional or "3 functional" core is comprised of three functional groups on which the macromolecule or branch is appended. In another embodiment, the tetrafunctional or "4 functional" core is comprised of four functional groups on which the macromolecule or branch is appended. Still other embodiments comprising cores with n=1-100 are also within the scope of the invention.

The functional groups of which the core is comprised may be any functional group amenable to click chemistry, such as, for example an azide or an alkyne. The core may also be comprised of functional groups such as alkene or thiol.

In one embodiment, the core is tetrafunctional, trifunctional, bifunctional or monofunctional.

In another embodiment, the core is bifunctional or monofunctional.

In still another embodiment, the core is bifunctional.

In certain aspects the dendrimeric structure and synthesis methods described herein differ from other dendrimeric structures and methods because the growth patterns of the dendrimeric structure provide for novel dendrimeric structures. Hence, geometric constraints that using only branch points at each iteration of dendrimer growth are alleviated by the methods described herein. In certain aspects, the structures and methods described herein provide for a method of varying radial density at various points from the core. In one embodiment, the density of the macromolecule at a given radial distance from the core is controlled by selective incorporation of branch molecules. In another embodiment, the density of the macromolecule at a given radial distance from the core is controlled by selective incorporation of macromolecules. In another embodiment, branching of the dendrimer is controlled by selective incorporation of heterotrifunctional branches. In another embodiment, branching of the dendrimer is controlled by selective incorporation of heterotrifunctional branches at different layers, shells, or generations of dendrimer growth.

In certain embodiments, the macromolecular density is about constant across the dendrimer. In certain embodiments, the macromolecular density is substantially constant across the dendrimer. For example, the macromolecular density at a first radius is substantially similar to the macromolecular density at a second radius. In some embodiments, macromolecular density varies by less than 50% across the dendrimer. In some embodiments, macromolecular density varies by less than 45% across the dendrimer. In some embodiments, macromolecular density varies by less than 40% across the dendrimer. In some embodiments, macromolecular density varies by less than 35% across the dendrimer. In some embodiments, macromolecular density varies by less than 30% across the dendrimer. In some embodiments, macromolecular density varies by less than 25% across the dendrimer. In some embodiments, macromolecular density varies by less than 20% across the dendrimer. In some embodiments, macromolecular density varies by less than 15% across the dendrimer. In some embodiments, macromolecular density varies by less than 10% across the dendrimer. In some embodiments, macromolecular density varies by less than 8% across the dendrimer. In some embodiments, macromolecular density varies by less than 5% across the dendrimer. In some embodiments, macromolecular density varies by less than 3% across the dendrimer. In some embodiments, macromolecular density varies by less than 2% across the dendrimer.

In one embodiment, the methods comprise a dendrimer wherein the density of the macromolecule near the core of the dendrimer is less than the macromolecular density at some radial distance from the surface. In one embodiment, the radial distance comprises the length of one macromolecule. In another embodiment, the radial distance comprises the length of two macromolecules. In another embodiment, the radial distance comprises the length of three macromolecules. In another embodiment, the radial distance comprises the length of four macromolecules. In another embodiment, the radial distance comprises the length of greater than one macromolecule. In another embodiment, the radial distance comprises the length of greater than two macromolecules. In another embodiment, the radial distance comprises the length of greater than three macromolecules. In another embodiment, the radial distance comprises the length of greater than four macromolecules.

In certain aspects, the polymeric macromolecules alleviate geometric and/or steric constraints that otherwise limit the dendrimeric structure.

The heterobifunctional macromolecules (e.g. heterobifunctional polymers functionalized with one azide chain terminus and a protected alkyne group as the other chain terminus, or functionalized with one alkyne group chain terminus and a non-click moiety terminus) and the heterotrifunctional branches (e.g. heterotrifunctional molecules functionalized with one azide moiety and two protected alkyne group moieties, or one alkyne moiety and two non-click moieties, or one non-click moiety and two click moieties) constitute a powerful and versatile means for the controlled assembly of dendrimeric structures. Each layer can be covalently bound to both the preceding and following layers to produce a robust multilayer structure. Because the coupling chemistry used, "click" chemistry, is chemoselective, the layering process can be independent of the chemical nature of the macromolecule so that the constitution of each monomolecular layer can be selected at will. Thus, in one embodiment, the methods and/or dendrimers comprise selective incorporation of monomolecular layers of differing constitution.

In contrast to other dendrimeric formation techniques, the radial density may be related to the polymer chain length and can be controlled by adjustment of either the polymer molecular weight or the areal density of branch groups. The chemical nature of each subsequent layer can be modified in a selective manner by choice of macromolecule or branch incorporated at each layer. Thus, in one embodiment, the methods comprise selective modification of layers by choice of macromolecule incorporated at each layer. In another embodiment, the methods comprise selective modification of layers by choice of branch incorporated at each layer. In yet another embodiment, the methods comprise selective modification of layers by choice of macromolecule and branch incorporated at each layer.

In addition to small organic molecules, the same principles of orthogonal growth at each generation would exist for nanoparticles functionalized with alkynes (see, for example, WO 10/053,993 and references therein; each herein incorporated by reference in its entirety). The branch unit would be integral for the dendron growth from the surface of the nanoparticle, facilitating the filling of the spherical density at larger distances from the nanoparticle surface. The density of simple linear polymer brushes grown from the surface would steadily decrease at higher generations. The inclusion of a branching point, however, would allow the density to be tailored based on at what points the branch was introduced. For instance, growth of generations of polymer in a linear fashion followed by several additions of the branch unit would yield a core-shell structure with a low polymer density near the surface of the nanoparticle and a high density at some radial distance from the surface. This density profile cannot be readily and reliably achieved any other way. Thus, in one embodiment, the methods comprise a generation of a density profile tailored based on introduction of branch molecules at desired radial distances from the core.

Figure 3:
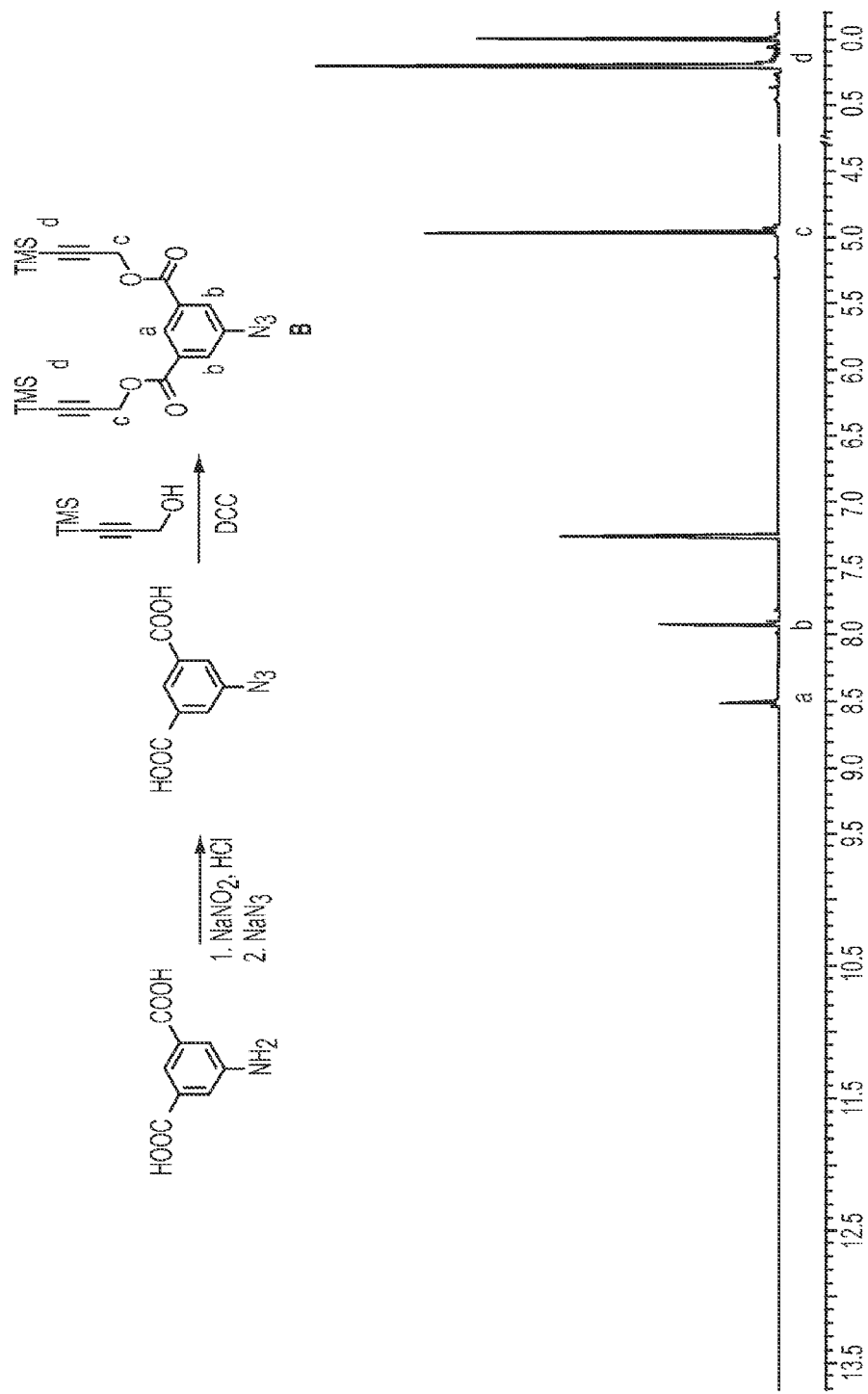
FIG. 3. A representative illustration of a synthetic scheme for a 3,5-bis (TMS-alkyne)-phenyl azide branching unit for azide-alkyne click chemistry.
Figure 4:
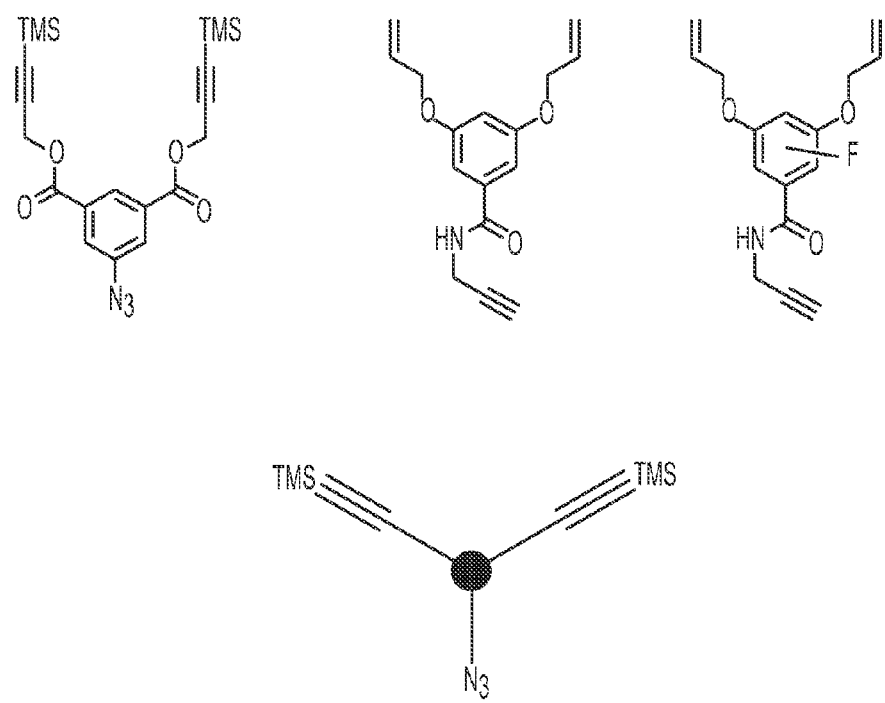
FIG. 4. Representative embodiments of branch molecules (B).

Controlled branching is readily incorporated by use of the heterotrifunctional branch (for example, a branch comprising one azide group and two TMS-alkyne groups as shown in FIGS. 3 and 4). Reaction of a branch with a terminal alkyne group doubles the number of functional groups per unit area as shown, for example in the case of nanoparticles, in FIG. 5. Branching can be used directly as a surface modification strategy for flat or curved surfaces, or the resultant supramolecular structure can be cleaved from the surface (using either the photocleavable or retro-Diels-Alder surface ligands) to produce molecules of dendritic nature. In one embodiment, these structures are advantageous in that the distance between branch units can be controlled by using α-azide,ω-TMS-alkyne-heterobifunctional macromolecules of different molecular weights, monomers, or any combination of the two. This is particularly relevant for modifying nanoparticles, because volume increases linearly with distance from the core. Branching is therefore required to keep the brush density from falling off as the distance from the nanoparticle increases. Dense brush peripheries are important for biological applications of nanoparticles where tethered polymers provide stealth.

Figure 6:
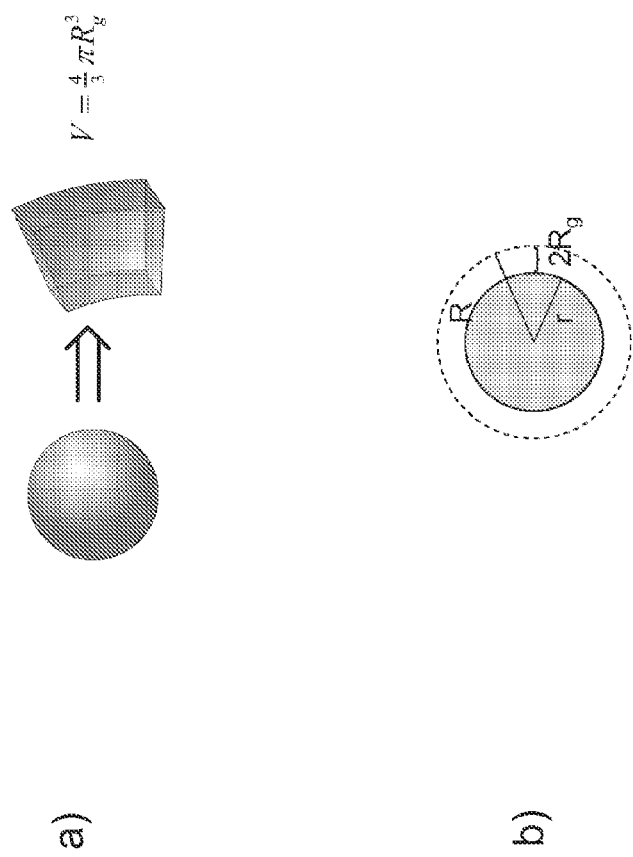
FIG. 6. Spherical volume (a) and radius (b) considerations for controlling radial density.

A branching unit thus allows growth from a surface and/or core and subsequent splitting of the functional end into multiple functional end groups. Control of radial density as polymers are grown from a surface or core can be understood as follows. Assume polymer chains occupy a space equal to a sphere with radius $R_g$, and that the spherical volume can deform to fill free volume, wherein $V=4/3(\pi R_g^3)$ (see, FIG. 6a). Assume subsequent generations occupy a sphere with a radius larger than the previous generation by twice $R_g$ (assume $R=r+2R_g$), and the branches do not occupy volume between macromolecular shells (FIG. 6b). The volume of a shell and the number of chains in that shell can be calculated according to equations 1 and 2, respectively:

$$V_{shell}=4/3(\pi R^3)-4/3(\pi r^3)=4/3\pi(R-r)^3 \quad \text{(Eq. 1)}$$

$$\text{\# chains in a shell}=V_{shell}/V_{chain}=(R-r)^3/R_g^3=6(r^2/R_g^2)+12(r/R_g)+8 \quad \text{(Eq. 2)}$$

The number of branching units required to fill the shell is therefore:

$$\text{\# branching units for shell}=f(R)-f(r)=f(r+2R_g)-f(r)=24(r/R_g)+48 \quad \text{(Eq. 3)}$$

Figure 7:
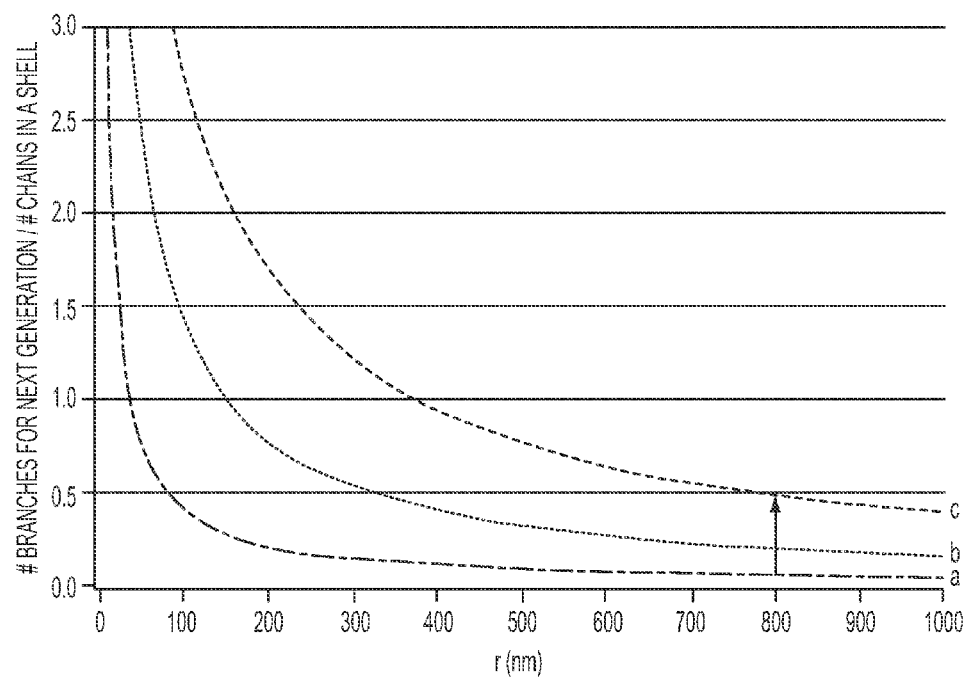
FIG. 7. The number of branches required per macromolecule in a shell in order to maintain a constant shell density as a function of the dendrimer or nanoparticle radius, r. The three curves represent different sizes of macromolecule. The macromolecule radii of gyration (Rg=nm) are 10 (a), 40 (b), and 100 (c).

The ratio between the number of branches to fill the next shell relative to the number of chains in a given shell must be greater than one in order to grow with constant radial density (FIG. 7 and Eq. 4).

$$1 \leq [24(r/R_g)+48]/[6(r^2/R_g^2)+12(r/R_g)+8] \quad \text{(eq. 4)}$$

$$R_{crit}/R_g \approx 3.77$$

| $R_g$ (nm) | $R_{crit}$ (nm) |
|---|---|
| 10 | ~38 |
| 40 | ~151 |
| 100 | ~377 |

In the table above, the critical ratio, $R_{crit}$, for a starting radius for growth (for example, from a nanoparticle or core) is approximately 3.8 times the radius of gyration of the polymer or macromolecule, $R_g$. These can also be expressed graphically as in FIG. 7.

A simple scaling analysis produced the results in FIG. 7: a representation of how many branches must be put into each shell to keep constant density in each shell or layer of dendrimer. In practice, the ratio of branch molecules to macromolecules cannot exceed a value of one. In other words there cannot be more branches than there are reactive chain ends in that shell or layer. The locations where the ordinate reaches a value of unity thus defines a critical value of nanoparticle or dendrimer radius to radius of gyration, which is about 3.77 for all radii of gyration, above which it is not possible to maintain constant density as a function of distance from the core. An exemplary way this plot would be used to estimate the number of branches required per chain to keep constant density is as follows: looking at the curve for Rg=100 (curve c), if the nanoparticle or dendrimer radius is 800 nm, the chart reads approximately 0.5 (see arrow in FIG. 7), indicating that one out of every two macromolecules must be coupled to a branch unit to retain constant density as a function of distance from the core. This structure can be assembled simply by using a 1:1 mixture of monofunctional:heterobifunctional macromolecules. Only one macromolecule need be synthesized as the required monofunctional macromolecule may be prepared by reacting some of the α-bromo,ω-alkyne-heterobifunctional precursor with phenyl azide to mask the alkyne functionality before conversion of the bromine to an azide. The use of deuterated phenyl azide and fluorinated phenyl azide in this application gives a chemical label for NMR and IR that may be used to follow the number of monofunctional macromolecules incorporated within the structure. In practice, one can examine how the density of branched surface layers on nanoparticles or dendrimers depends on macromolecule molecular weight, solvent quality and number of branches per shell using thermal gravimetric analysis, infrared spectroscopy and small angle neutron scattering.

Figure 5:
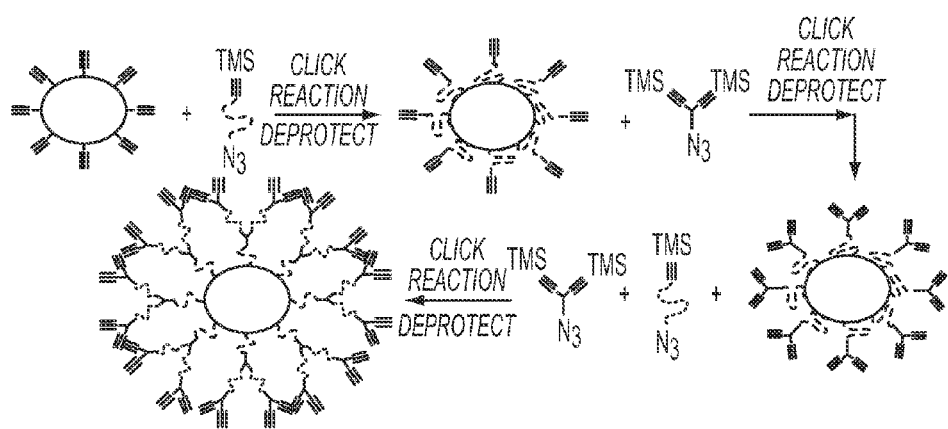
FIG. 5. Incorporation of controlled branching for dendrimeric-like modification of nanoparticles comprising two different polymer shells.

With controlled branching it is also possible to build nanovoids into nanoparticle superstructures by starting with a low brush density, and then increasing the brush density by branching away from the surface. Nanovoids can be used to deliver various payloads or to adsorb particular species to sequester them from a bulk material in a separation process. Because the coupling chemistry is chemoselective, the macromolecules incorporated into these branched structures can have virtually any chemical structure and function. No other existing method for the preparation of branched polymers, dendrimers or polymer dendrimers is capable of preparing such complex yet controlled structures in which the radial dependence of density can be controlled quantitatively. For example, FIG. 5 shows a block copolymer dendrimer with two different polymer shells, however, the number of shells possible is only limited by the efficiency of the coupling reactions.

The branch unit would be integral for the dendron growth from the surface of the nanoparticle, facilitating the filling of the spherical density at larger distances from the nanoparticle surface. In contrast, the density of simple linear polymer brushes grown from the surface would steadily decrease at higher generations. The inclusion of a branching point, however, would allow the density to be tailored based on at what points the branch is introduced. For instance, growth of generations of macromolecules in a linear fashion followed by several additions of the branch unit would yield a core-shell structure with a low macromolecule density near the surface of the nanoparticle and a high density at some radial distance from the surface. This density profile cannot be readily and reliably achieved any other way. Thus, in some embodiments, the methods comprise a dendrimer or dendrimeric brush wherein the macromolecule density some radial distance from the nanoparticle is controlled by selective incorporation of heterotrifunctional branches. In certain embodiments, the methods comprise a dendrimer or dendrimeric brush wherein the macromolecule density is not inversely proportional to radial distance from the nanoparticle. In certain embodiments, the methods comprise a dendrimer or dendrimeric brush wherein the macromolecule density is about proportional to radial distance from the nanoparticle. In certain embodiments, the methods comprise a dendrimer or dendrimeric brush wherein the macromolecule density does not steadily decrease with increasing radial distance from the nanoparticle surface. In certain embodiments, the methods comprise a dendrimer or dendrimeric brush wherein the macromolecule density near the nanoparticle surface is less than the macromolecule density at some radial distance from the nanoparticle surface. In certain embodiments, the methods comprise a dendrimer or dendrimeric brush wherein the macromolecule density near the nanoparticle surface is greater than the macromolecule density at some radial distance from the nanoparticle surface. In certain embodiments, the methods comprise a dendrimer or dendrimeric brush wherein the macromolecule density near the nanoparticle surface is about the same as the macromolecule density at some radial distance from the nanoparticle surface. In one embodiment, the radial distance comprises the length of one macromolecule. In another embodiment, the radial distance comprises the length of two macromolecules. In another embodiment, the radial distance comprises the length of three macromolecules. In another embodiment, the radial distance comprises the length of four macromolecules. In another embodiment, the radial distance comprises the length of greater than four macromolecules.

The branch unit would also be integral for the dendrimer growth from the surface of the core, facilitating the filling of the spherical density at larger distances from the core. In contrast, the density of simple linear macromolecules grown from the surface would steadily decrease at higher generations. The inclusion of a branching point, however, would allow the density to be tailored based on at what points the branch is introduced. For instance, growth of generations of macromolecule in a linear fashion followed by several additions of the branch unit would yield a core-shell structure with a low macromolecule density near the core and a high density at some radial distance from the core. This density profile cannot be readily and reliably achieved any other way. Thus, in some embodiments, the methods comprise a dendrimeric structure wherein the macromolecule density at some radial distance from the surface is controlled by selective incorporation of heterotrifunctional branches. In certain embodiments, the methods comprise a dendrimeric structure wherein the macromolecule density is not inversely proportional to radial distance from the core. In certain embodiments, the methods comprise a dendrimeric structure wherein the macromolecule density is about proportional to radial distance from the core. In certain embodiments, the methods comprise a dendrimeric structure wherein the macromolecule density does not steadily decrease with increasing radial distance from the core. In certain embodiments, the methods comprise a dendrimeric structure wherein the macromolecule density near the core is less than the macromolecule density at some radial distance from the surface. In certain embodiments, the methods comprise a dendrimeric structure wherein the macromolecule density near the core is greater than the macromolecule density at some radial distance from the surface. In certain embodiments, the methods comprise a dendrimeric structure wherein the macromolecule density near the core is about the same as the macromolecule density at some radial distance from the surface. In one embodiment, the radial distance comprises the length of one macromolecule. In another embodiment, the radial distance comprises the length of two macromolecules. In another embodiment, the radial distance comprises the length of three macromolecules. In another embodiment, the radial distance comprises the length of four macromolecules. In another embodiment, the radial distance comprises the length of greater than polymer macromolecules.

With selective incorporation of branching, the radial density of the dendrimeric structure can increase exponentially with increasing radial distance from the core. In certain embodiments, the density per layer, shell or generation is about 500 Da to about 5,000,000 Da. In certain embodiments, the density per layer, shell or generation is about 500 Da to about 1000 Da; about 1000 Da to about 2 kDa, about 2 kDa to about 10 kDa; about 10 kDa to about 20 kDa, about 30 kDa; about 30 kDa to about 40 kDa; about 40 kDa to about 50 kDa; about 50 kDa to about 75 kDa; about 75 kDa to about 100 kDa; about 100 kDa to about 150 kDa; about 150 kDa to about 200 kDa; about 200 kDa to about 250 kDa; about 250 kDa to about 300 kDa; about 300 kDa to about 350 kDa; about 350 kDa to about 400 kDa; about 400 kDa to about 450 kDa; about 450 kDa to about 500 kDa; about 500 kDa to about 550 kDa; about 550 kDa to about 600 kDa; about 600 kDa to about 650 kDa; about 650 kDa to about 700 kDa; about 700 kDa to about 750 kDa; about 750 kDa to about 800 kDa; about 800 kDa to about 850 kDa; about 850 kDa to about 900 kDa; about 900 kDa to about 950 kDa; about 950 kDa to about 1 kDa; about 1,000 kDa to about 1,500 kDa; or about 1,500 kDa to about 2,000 kDa, where any stated values can form a lower and/or upper endpoint of a molecular weight range as appropriate or where any of the lower limits can be combined with any of the upper limits.

Figure 8:
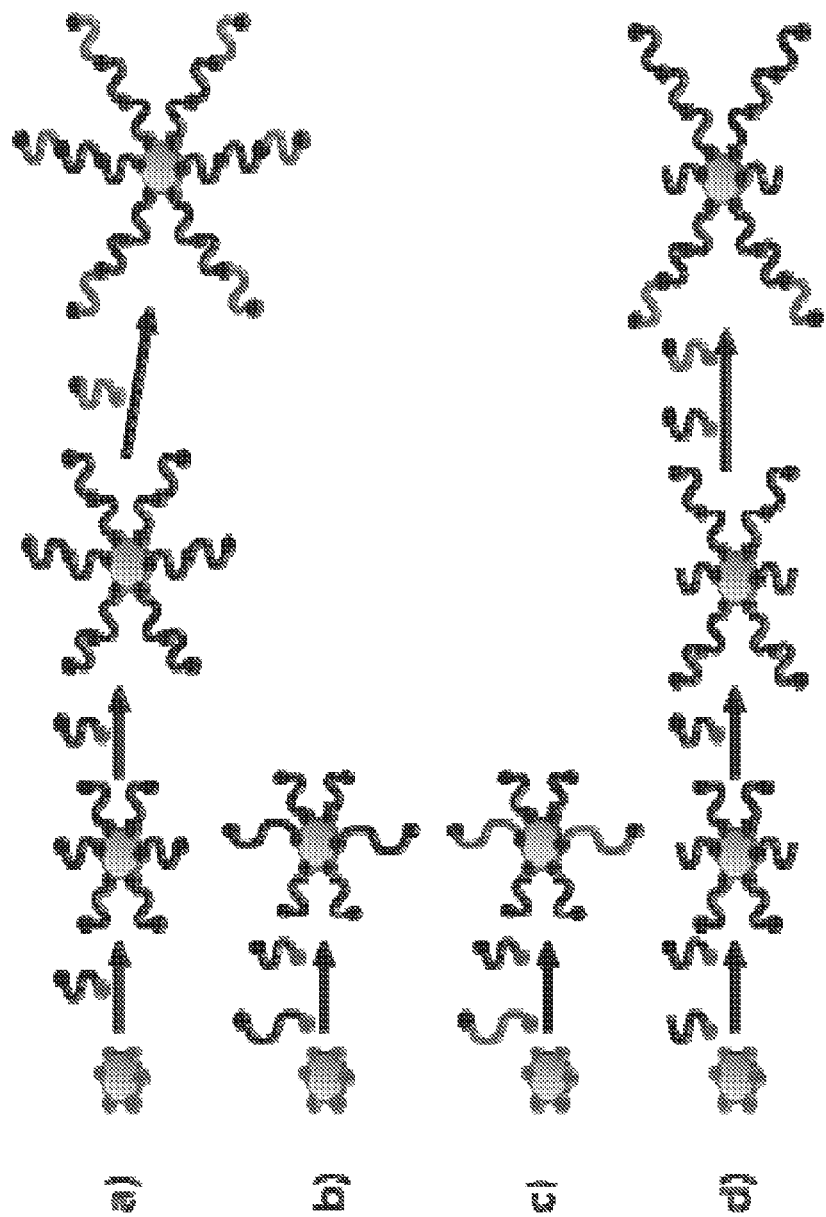
FIG. 8. Representative surface structures: (a) changing molecular weight and composition by repetitive addition; (b) incorporation of two different macromolecule lengths; (c) incorporation of two different macromolecular structures; (d) capping by use of monofunctional building blocks to create asymmetric surface modification.

In some embodiments, the dendrimeric structures may be synthesized via a solid phase synthesis approach. A unique feature of a solid—phase synthesis (SPS) approach is its ability to incorporate heterogeneity into supramolecular structures, either for the creation of complex molecules or the synthesis of surface structures. FIG. 8 illustrates a variety of heterogeneous structures that can be made with SPS. In FIG. 8(a), the length of brush can be doubled by adding two polymer building blocks and brushes may be capped off with a second different polymer building block. FIG. 8(b) shows how different lengths of species can be incorporated into a single shell. FIG. 8(c) illustrates how each shell can contain brushes made from different polymers, that is, mikto-arm nanoparticles. FIG. 8(d) shows how monofunctional macromolecules are used to terminate a desired number of brushes leading to asymmetric decoration with block copolymer brushes.

To identify chemical components and structures of dendritic polymers (DPs), Nuclear Magnetic Resonance (NMR, most $^1$H or $^{13}$C) is certainly the most widely used in routine analysis (Adv. Drug Delivery Rev. 2005, 57, 2130; J. Frechet, D. Tomalia, D. A. "Dendrimers and other Dendritic Polymers", John Wiley and Sons, Chichester, 2001; herein incorporated by reference in its entirety). The resonances of heteroatoms ($^{19}$F, $^{11}$B, $^{15}$N, $^{29}$Si or $^{31}$P) can also afford very valuable information for heteroatom-containing DPs. Two-dimensional or three-dimensional NMR were also applied for a better assignment of signals. Moreover, NMR is extensively used to determine the degree of branching for ill-defined DPs (hyperbranched polymers) Infra-red (IR) and Raman are also convenient tools to monitor the DPs synthesis and identify DPs structures. Ultra-violet-visible and fluorescence spectroscopies are useful for the DPs with chromophoric units (encapsulated or covalently bonded) to monitor their synthesis and study properties of interior cavities or exterior spaces. Considering that DPs are globular macromolecules, Size Exclusion (or Gel Permeation) Chromatography (SEC or GPC) allows the separation of molecules according to size and thus calculates the relative molecular weights and the distributions of molecular weights. Known dendrimers, rather than generally used linear polymers, are applied as calibration standards in order to improve accuracy of measurement. Mass spectrometry, especially the Matrix Assisted Laser Desorption Ionization Time of Flight (MALDI TOF), as an alternative, is a sensitive and powerful method to provide absolute molecular weights and their distributions. Since DPs are also three-dimensional polymeric nanoparticles, various microscopies (Atomic Force Microscopy (AFM) or Transmission Electron Microscopy (TEM)) are used to characterize sizes of DPs. Scattering techniques (Small angle X-ray scattering (SAXS), Small angle neutron scattering (SANS), or Laser light scattering (LLS)) are chosen to give information about the average radius of gyration and particle aggregation in solution. Differential Scanning calorimetry and Thermogravimetric analysis (TGA) are commonly used to characterize DP's thermal properties, such as glass transition temperature.

Small angle neutron scattering may be used to characterize the internal structure of a limited number of branched systems that may be conducive to the analysis. In the case of branched molecules prepared on, for example, silica nanoparticles, separation simply involves collection or centrifugation before cleavage. For soluble substrates, unreacted reactants can be removed by adding an excess of functional polymers, nanoparticles or microparticles with complementary reactive functionality that act as scavengers. The scavengers are removed either by precipitation with a non-solvent or by centrifugation.

In one embodiment, the methods provide for preparation of heterotrifunctional branch molecules that are capable of introducing controlled branching via solid phase polymer synthesis methods, and the use of these branch units to prepare novel hyperbranched molecules that can incorporate any number of monomers, macromolecules and branch units into structures of any desired sequence, regardless of the chemical nature of the building blocks.

Multiple orthogonal coupling reactions sometimes eliminate altogether the need for protection reactions in solid phase synthesis. For example, multiple orthogonal linking chemistries (Angew. Chem., Int. Ed. 1994, 33, 82-85; herein incorporated by reference in its entirety) and orthogonal click chemistries (Macromolecules 2010, 43, 6625-6631; herein incorporated by reference in its entirety) were used to devise inspiring methods for accelerated synthesis of dendrimers. Multiple chemistries have also been used to create so-called "dynamic polyconjugates" (J. Am. Chem. Soc. 2009, 131, 5751-5753; herein incorporated by reference in its entirety).

Figure 9:
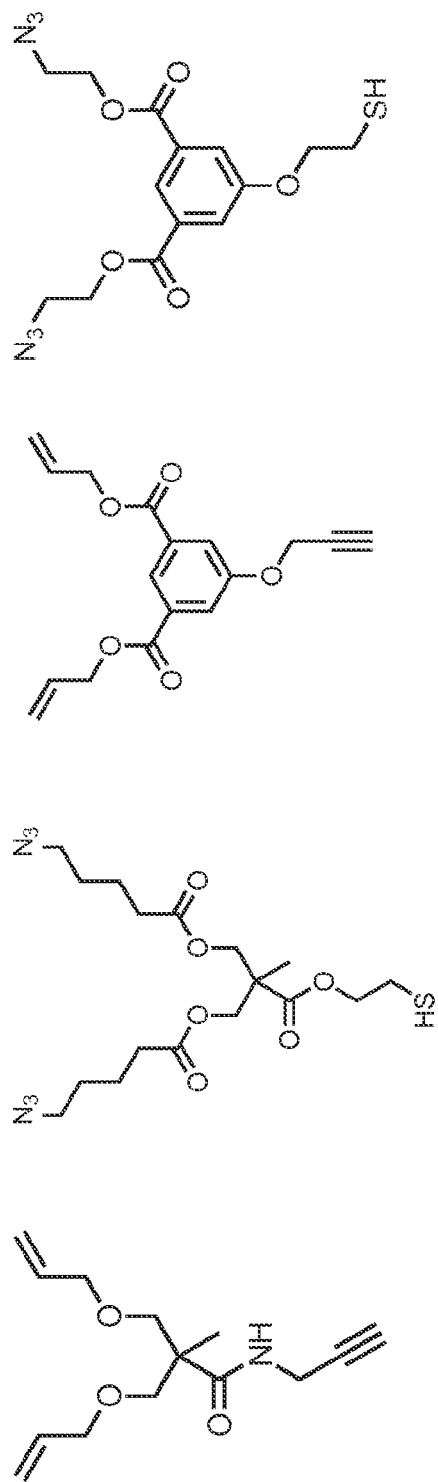
FIG. 9. Representative $AB_2$ branch molecules.
Figure 10:
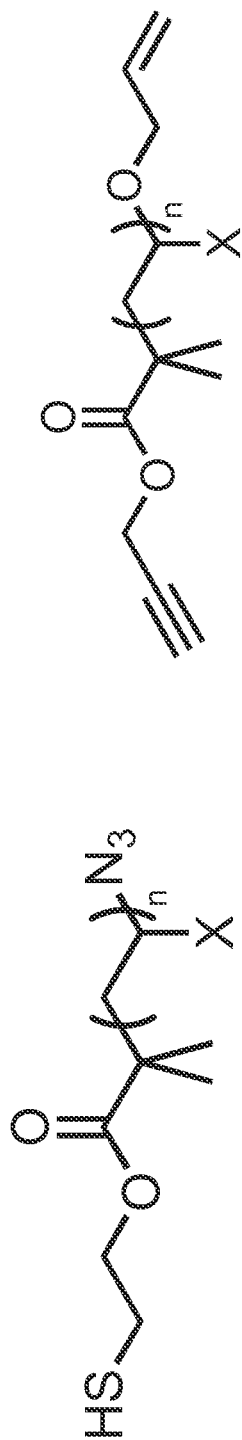
FIG. 10. Representative AB and CD macromolecules for thiol-ene and azide-alkyne click chemistry.
Figure 11:
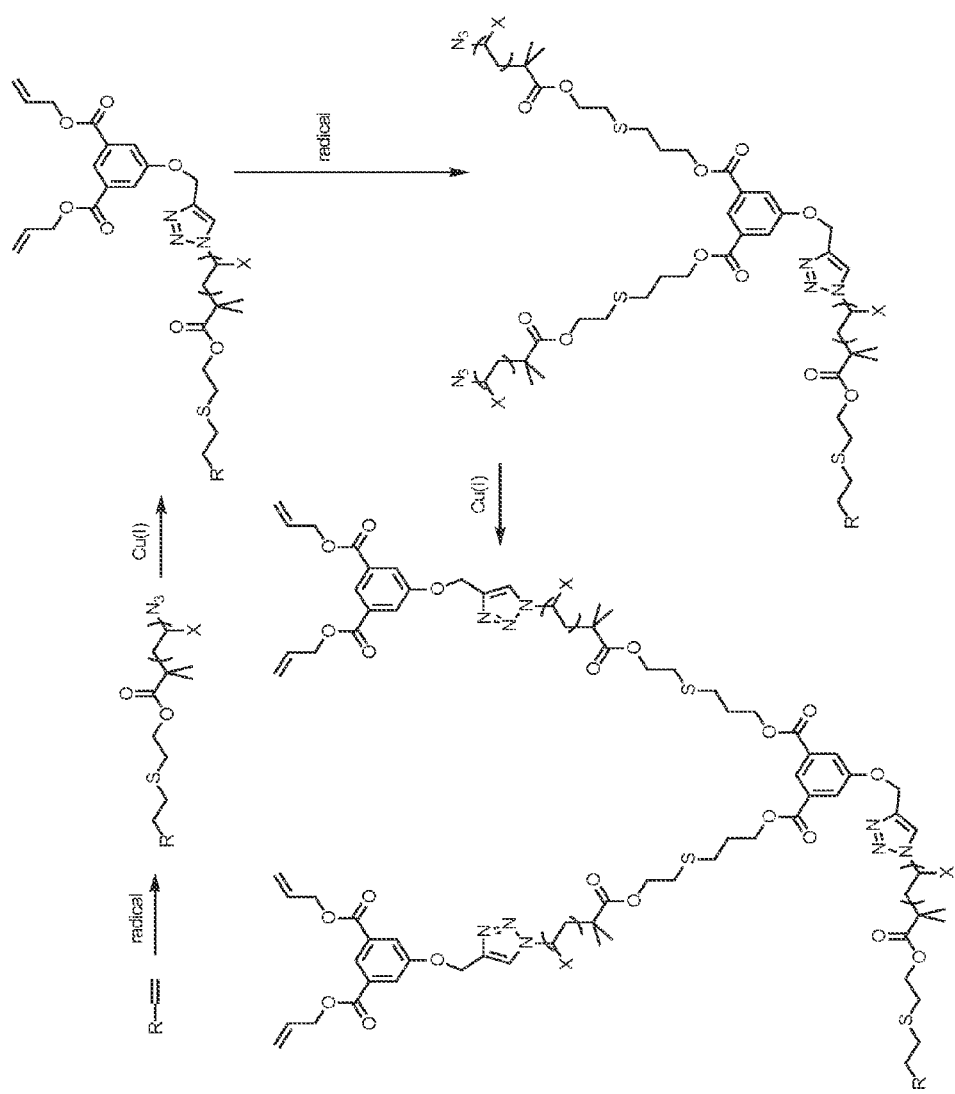
FIG. 11. Modular construction of an $AB-CD_2$ polymer-dendrimer using complimentary heterobifunctional and heterotrifunctional molecules.

As an example, FIG. 9 shows four branching units that can be used to grow dendrimers without the need for protecting groups. These branching units take advantage of the orthogonality of thiol-ene (A to D) and azide-alkyne (B to C) click reactions and the left two molecules were used for accelerated dendrimer construction (Macromolecules 2010, 43, 6625-6631; herein incorporated by reference in its entirety). The orthogonal crosslinkers used to prepared dendrimers were thus an $AB_2/CD_2$ system. That is, sequential reactions of the two molecules on the left of FIG. 9 produced the dendrimer. Because the thiol can react with an alkyne, these reactions are only strictly orthogonal when applied in the correct sequence so that alkyne and thiol groups do not come in contact. The two molecules on the right of the figure employ the same chemistries and can also be useful for the present application. To complement the branch units, the molecular toolkit further incorporates AB and CD monomers and macromolecules of the type shown, for example, in FIG. 10. The monomers can be prepared in similar fashion to the type BC monomers discussed herein and, for example, in WO 10/053,993; herein incorporated by reference in its entirety. The macromolecules can be prepared, for example, by ATRP. In the first case, the thiol-azide macromolecule is prepared using a thiol functional initiator then converting the bromine end group to azide by addition of sodium azide, and in the second case, the alkyne-ene macromolecule is prepared by use of an alkyne functional initiator and conversion of the terminal bromine to an ene by base-promoted coupling with allyl alcohol. The means of constructing a modular macromolecule-based dendrimer, classified as an AB-CD$_2$ approach, is described, for example, in FIG. 11.

Beginning with an ene-functional core or surface, an αthiol,ω-azide-heterobifunctional macromolecule undergoes a radical-assisted addition at its thiol terminus and presents an azide terminus. The alkyne group of the CD$_2$ branch unit adds to the azide by a CuAAC reaction, regenerating an ene-functional periphery.

Figure 12:
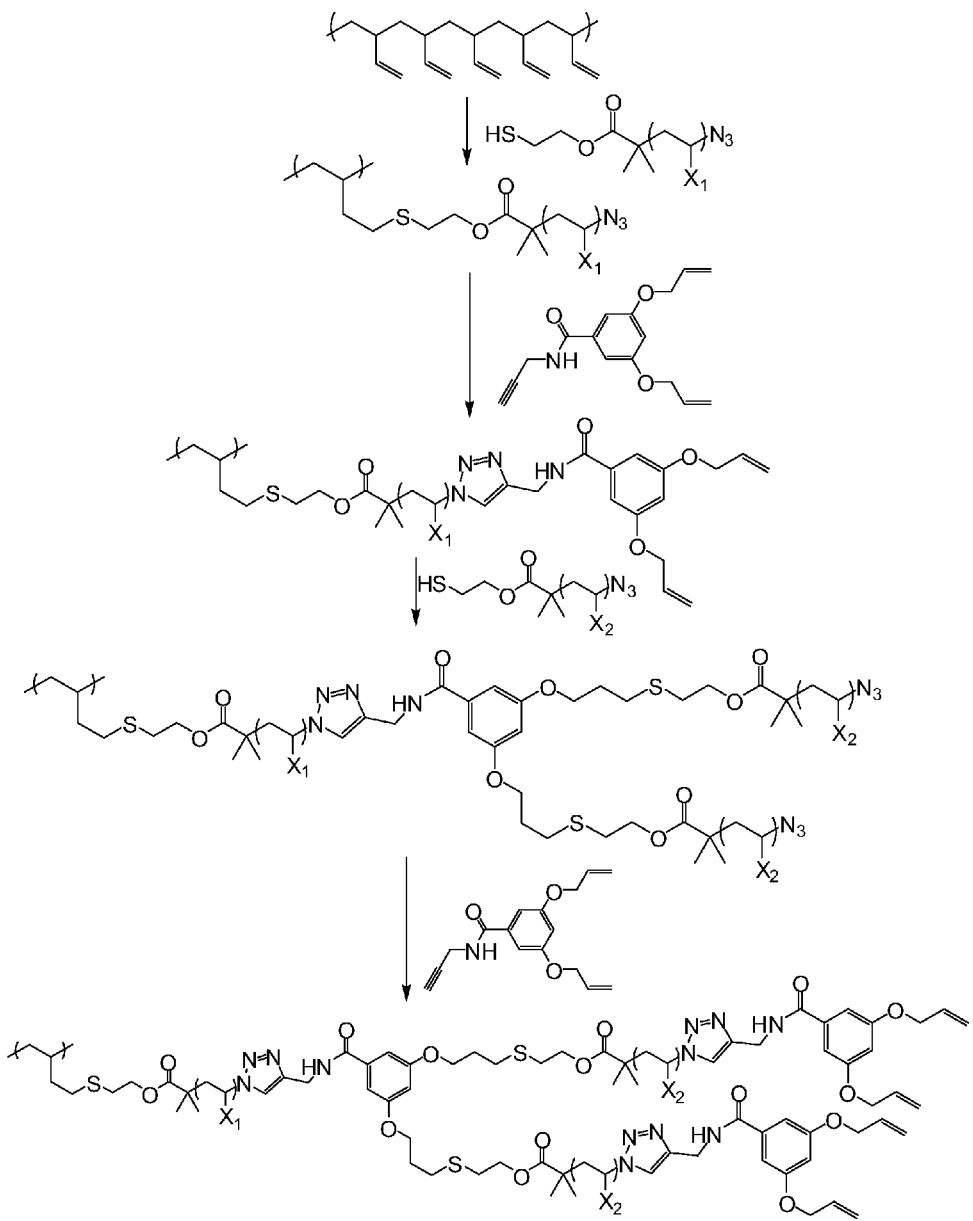
FIG. 12. Representative growth of dendrimeric structures from a polydiene core via sequential addition of α-thiol, ω-azide-heterobifunctional macromolecule and a heterotrifunctional alkyne-diene branch.

The procedure can be repeated as many times as necessary and can employ any size, type or number of AB macromolecules as well as AB monomers. As such, it is much more versatile than any current means for dendrimer formation. For example, the three primary building blocks, monomer, macromolecule and branch unit can be added in effectively any sequence. For example, two different monomers can be followed by two different macromolecules which are followed by a branch unit and so on. In addition, the support can be a solid substrate or nanoparticles, or could equally be a soluble support. FIG. 12 illustrates how the approach is used to modify a polydiene to create a kind of bottle brush copolymer dendrimeric structure.

Figure 13:
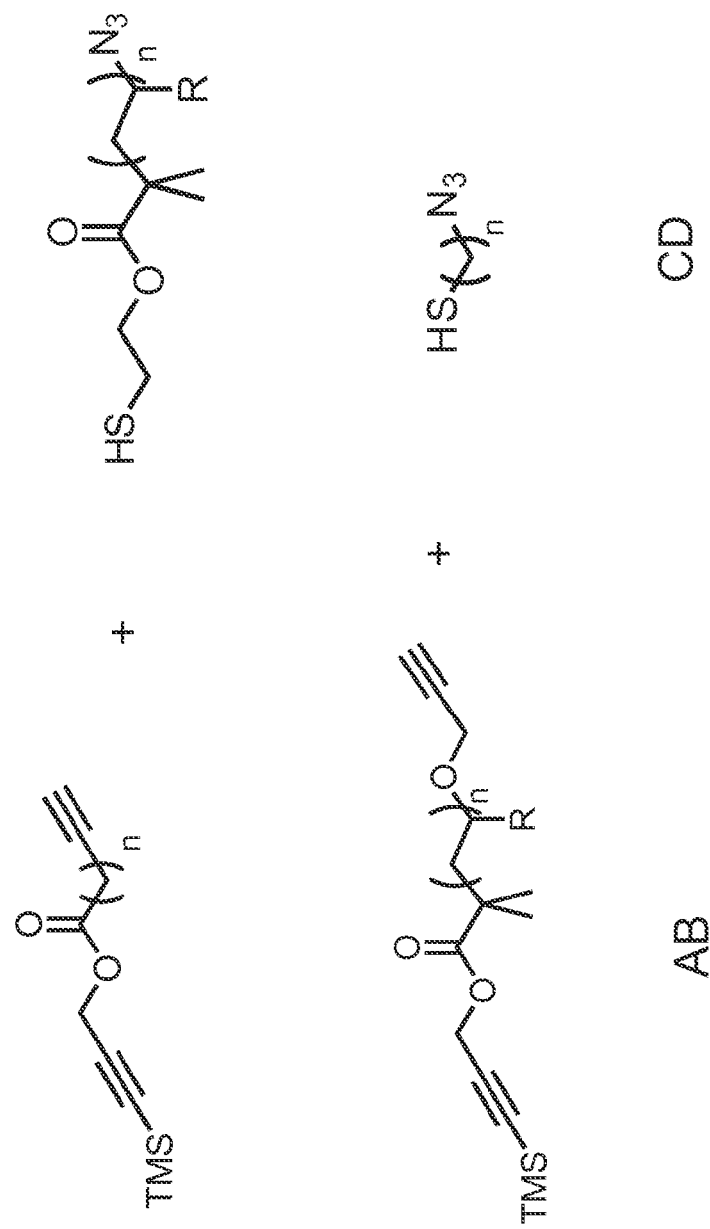
FIG. 13. Representative AB and CD macromonomer building blocks with complimentary heterobifunctionality.
Figure 14:
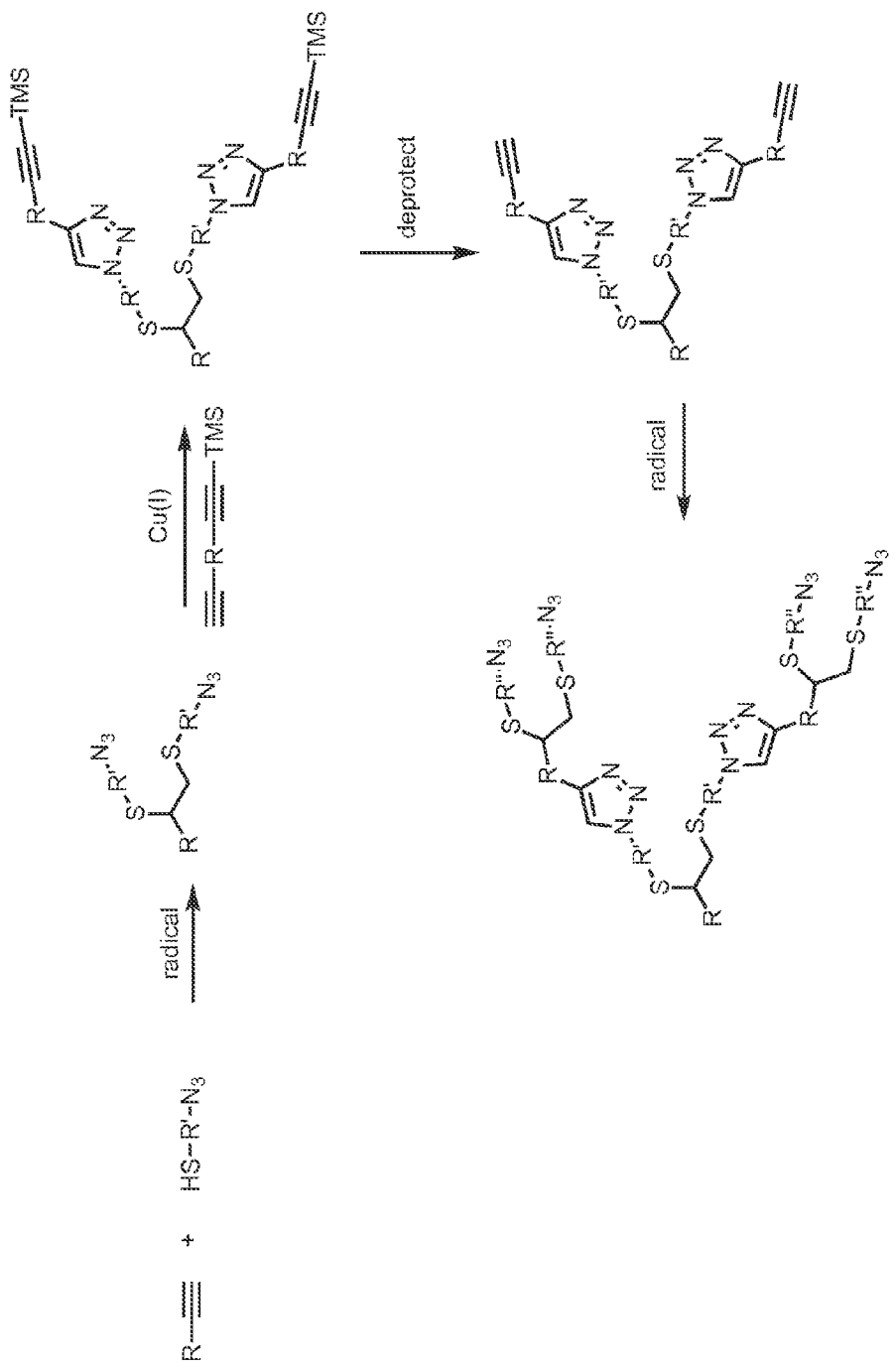
FIG. 14. Representative synthesis of an AB-CD dendrimer using complementary heterobifunctionality.

In addition to the AB-CD$_2$ embodiment, an AB-CD embodiment (see FIG. 13) melds both the protection/deprotection and multiple orthogonal reaction approaches. Branching results from the two-fold addition of thiols across a triple bond (*J. Am. Chem. Soc.* 2009, 131, 5751-5753; *J. Am. Chem. Soc.* 2009, 131, 14673-14675; *J. Am. Chem. Soc.* 2009, 131, 18075-18077; each herein incorporated by reference in its entirety). Here, a heterobifunctional core molecule is paired with a heterobifunctional polymer to generate the dendrimer. FIG. 14 shows an exemplary radical initiated addition of two thiols across the terminal alkyne (thiol-yne 'click' chemistry) followed by the CuAAC reaction of a heterobifunctional polymer where one end is a terminal alkyne and the other is an alkyne that has been protected with TMS. Only the terminal alkyne end will react giving a branched structure terminated by protected alkynes. The TMS group is readily removed to regenerate a terminal alkyne that is then available once again for the radical initiated addition of two thiols, generating a branch point. Repetition of this cycle has the potential to generate very high molecular weight dendritic polymers from linear precursors.

The beauty of both the AB-CD$_2$ and AB-CD approaches is that each generation of polymer can have vastly different properties because each macromolecule can be different. Standard ATRP synthesis of linear block copolymers is limited by the need for blocks to be added in order of decreasing activity of monomers. As a result, a block copolymer where the activity of a subsequent block is higher than the previous block is not possible. Using the new technique, block copolymers and block copolymer dendrimers are possible regardless of the activity of the monomers because the linking chemistry is independent of the synthesis chemistry. Furthermore, by judiciously choosing the order of macromolecule addition, materials with unique properties can result.

Dendrimer molecular weights may be determined by Matrix-Assisted Laser Desorption/Ionization spectroscopy (MALDI), a technique that is often used for delicate biopolymers such as proteins and peptides in addition to mid-molecular weight polymers and dendrimers. A solution of polymer in a crystallized matrix is ionized by a laser and then analyzed using time-of-flight mass spectrometry (TOF). MALDI-TOF is useful for polymers and dendrimers in the molecular weight range of 1,000 Da to 70,000 Da, but is limited for larger and smaller molecules outside this range, and may depend on the type of detector used. Because of the limitations imposed by the TOF spectrometry, MALDI-TOF is useful when constructing architectures using small monomeric or macromolecular building blocks at low generations. Molecular weights of macromolecules will be determined using a GPC equipped with three detectors: refractive index, UV and light scattering.

In addition to mass spectroscopic techniques, one may use $^1$H NMR to characterize dendrimers grown by a sequential divergent synthesis from macromolecular α-thiol,ω-azide-heterobifunctional macromolecules and heterotrifunctional alkyne-diene branch points. One may further build upon that characterization technique by synthesizing and using the two branch units shown on the right hand side in FIG. 9. The benefit of these branch units is the ability to monitor the number of aromatic protons incorporated with each additional generation because the aromatic protons are shifted significantly downfield in the $^1$H NMR spectrum from the protons associated with many polymers and the functionalities of the 'click' moieties. By correlating the aromatic proton signals to the overall NMR spectrum and the mass spectrum, one can assess the efficiency with which each generation is added and to determine the numbers of 'dangling ends' in the growing dendrimer. In another embodiment, versions of the crosslinkers with fluorinated phenyls may be synthesized and fluorine NMR used to characterize the branching reactions.

In one embodiment, the methods develop the concept of multiple orthogonal reactions in solid phase synthesis as a tool to incorporate monomers, macromolecules and branch units of any size or chemical nature into complex supramolecular structures of specific design and sequence.

The solid phase synthesis toolkit enables the molecular assembly of complex supramolecular structures of virtually any structure from a limited number of heterofunctional molecular building blocks: monomers, macromolecules and branch units. The method is extremely versatile, such that many heterogeneous polymer systems are possible. The potential impact on polymer material science is thus substantial as are the number of possible applications. The technique can make any kind of copolymer, from alternating to segmented block copolymers. Block copolymers are used extensively in elastomer applications that range from tires to clothing. Since copolymers can be prepared that have never been prepared before, one can observe new properties that can be exploited for new applications. The technique can also make branched molecules of essentially any structure, many of which have again never been prepared before. Branched polymers are used to modify the viscosity of oil, to toughen brittle polymers and form the basis of many sensors and separation media.

In one embodiment, these structures can be used to modify substrate surfaces, which can be used to control wetting, to prevent corrosion, or to modify friction and wear. When applied to nanoparticles, these methods can produce hybrids that have potential applicability as high dielectric constant coatings (*Macromol. Rapid Commun.* 2008, 29, 1544-1548; herein incorporated by reference in its entirety) for microelectronics and as transparent materials of high refractive index. Additionally, because these methods preserve end group functionality, they can be used to prepare multifunctional nanoparticles that can be used as highly efficient crosslinkers or to prepare matrix-free nanocomposites that are not subject to aggregation effects (*Macromolecules* 2010, 43, 6549-6552; herein incorporated by reference in its entirety).

Figure 15:
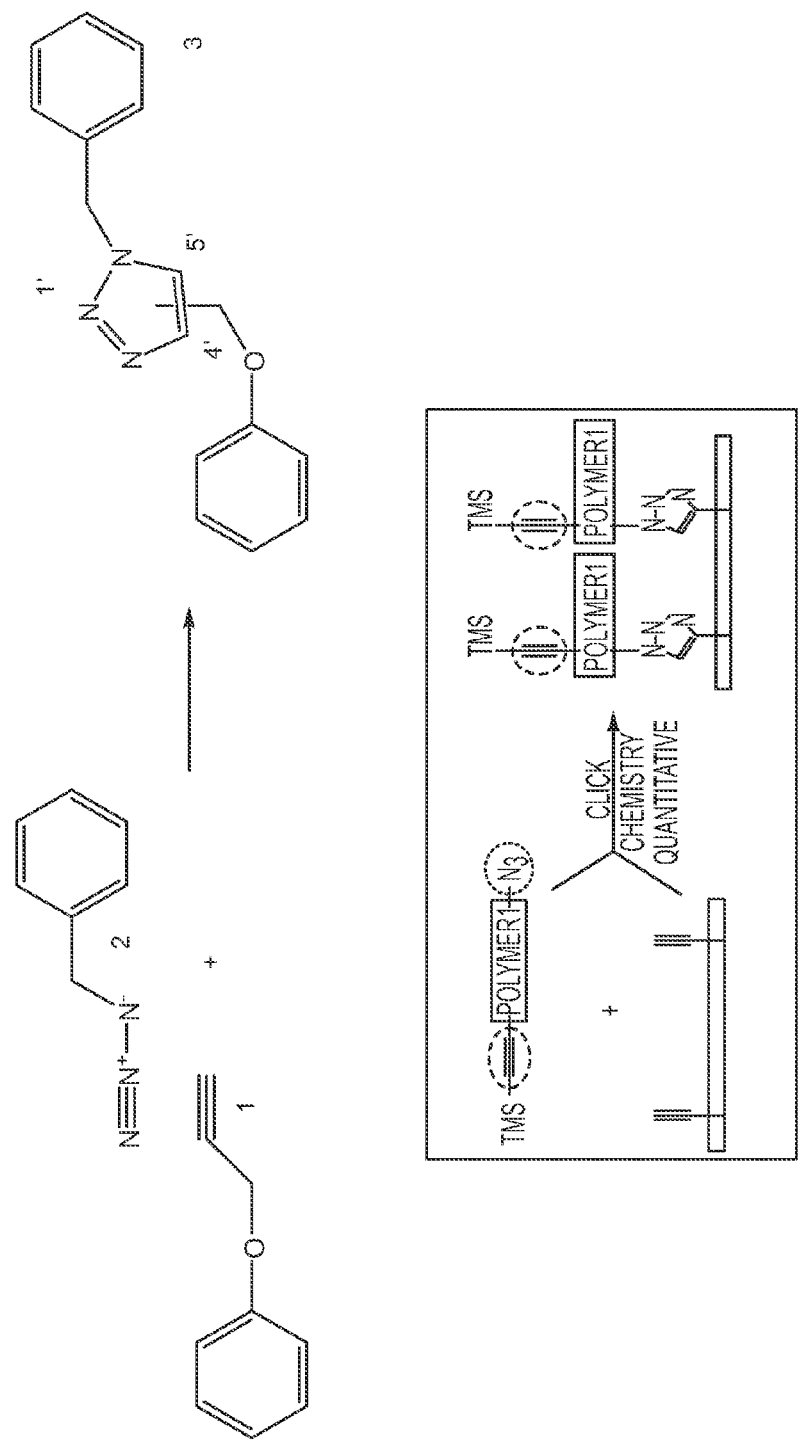
FIG. 15. Representative embodiments of click chemistry method used to functionalize.
Figure 16:
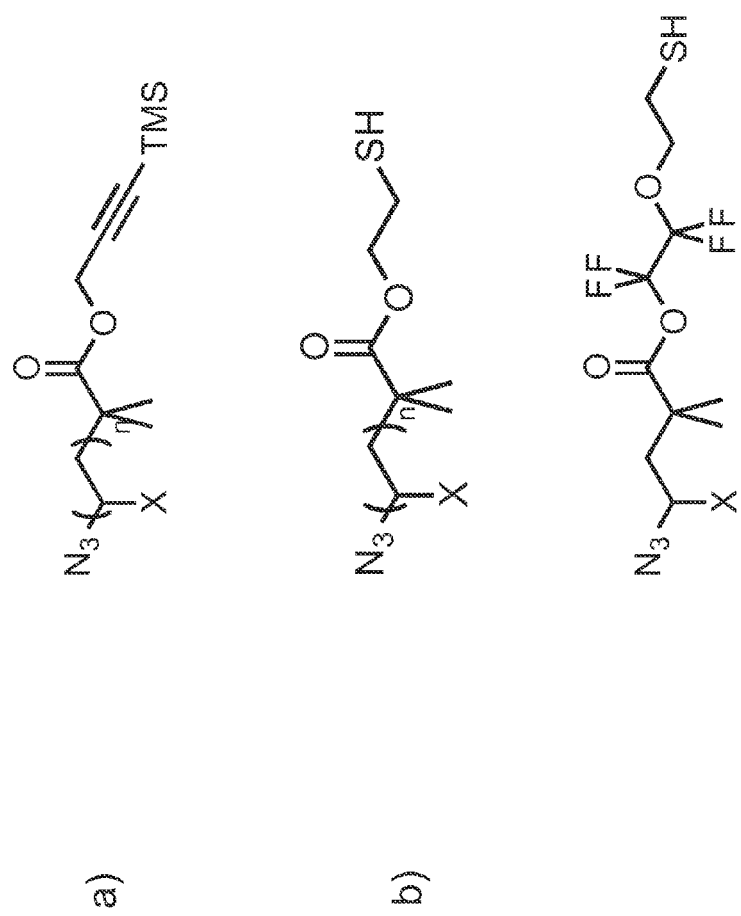
FIG. 16. Representative embodiments of a) a α-silyl-alkynyl-ω-azido macromolecule (M) and b) a α-thiol-ω-azido macromolecule (M).

In certain embodiments, covalent linking involves a "click" reaction (e.g., 1,3-dipolar cycloaddition) between a first click moiety (e.g. a deprotected alkyne group) on a macromolecule, core or branch, and a second click moiety (e.g. an azide terminus) on a macromolecule or branch (see, for example, FIG. 15).

The click reactions described herein can be performed by contacting a first macromolecule comprising a polymer backbone, a deprotected first click moiety terminus and a second click moiety terminus with a second macromolecule comprising a polymer backbone, a first click moiety terminus and a second click moiety terminus. The click reactions described herein can also be performed by contacting a macromolecule comprising a polymer backbone, a deprotected first click moiety terminus and a second click moiety terminus with a heterotrifunctional branch comprising a first click moiety group and at least two second click moiety groups.

In one embodiment, the one click moiety is an alkyne group terminus and another click moiety is an azide terminus, however any type of click chemistry can be used in conjunction with the methods described herein so long as the first and second click moiety termini (e.g. click chemistry pairs) can participate in a selective covalent bond forming reaction with each other.

Examples of click chemical moieties suitable for use with the methods described herein include, but are not limited to, alkynyl groups, azido groups, nitrile groups, conjugated diene groups, epoxide groups, carbonyl groups, aziridine groups, or the like. Exemplary click chemistry pairs can include, but are not limited to, 1,3-Huisgen Dipolar Cycloaddition (e.g. wherein a first click moiety terminus is an alkyne group and a second click moiety terminus is a azide group), 1,3-Huisgen Dipolar Cycloaddition (e.g. wherein a first click moiety terminus is a nitrile group and a second click moiety terminus is an azide group), Diels-Alder Cycloaddition (e.g. wherein a first click moiety terminus is a dienophile group and a second click moiety terminus is a diene group), Non-Aldol Carbonyl Chemistry (e.g. wherein a first click moiety terminus is an isothiocyanate or an isocyanate group and a second click moiety terminus is an amine group), Non-Aldol Carbonyl Chemistry (e.g. wherein a first click moiety terminus is a ketone group and a second click moiety terminus is an alkoxyamine group), Non-Aldol Carbonyl Chemistry (e.g. wherein a first click moiety terminus is an aldehyde group and a second click moiety terminus is an alkoxyamine group), Michael addition (e.g. wherein a first click moiety terminus is an enolate group and a second click moiety terminus is an alpha ketone group), Michael addition (e.g. wherein a first click moiety terminus is an enolate group and a second click moiety terminus is a beta ketone group), Michael addition (e.g. wherein a first click moiety terminus is an enolate group and a second click moiety terminus is an unsaturated ketone group), and Nucleophilic Ring Opening Reactions (e.g. wherein at least one click moiety terminus is an epoxide group). In certain embodiments, two or more polymer layers in the multilayer polymer composition described herein can be covalently joined by the same type of click chemistry reaction (e.g. a 1,3-dipolar cycloaddition click reaction). In certain embodiments, two or more polymer layers in the multilayer polymer composition described herein can be covalently joined by the a different type of click chemistry reaction.

A thermally initiated "click" reaction between alkyne groups and the azide termini can then be achieved by heating the molecules comprising the alkyne and azide for about 3 hours to about 12 hours at a temperature of about 100° C. to about 115° C. In certain examples, the click reactions (e.g. a 1,3-dipolar cycloaddition click reaction) described herein can be performed at a temperature from about −4° C. to about 130° C., from about 4° C. to about 125° C., from about 30° C. to about 120° C., from about 55° C. to about 115° C., from about 75° C. to about 115° C., from about 90° C. to about 115° C., or from about 100° C. to about 115° C.

Although thermal initiation can be used to perform the click reactions (e.g. a 1,3-dipolar cycloaddition click reaction) described herein, the click reactions (e.g. a 1,3-dipolar cycloaddition click reaction) can also be achieved with the addition of a metal catalyst. In certain embodiments the metal catalyst is a metal selected from the group consisting of Au, Ag, Hg, Cd, Zr, Ru, Fe, Co, Pt, Pd, Ni, Cu, Rh, W, Ru, Pt, Ni, Cu, and Pd. In one embodiment, one or more metal catalysts can be used to achieve the click reactions (e.g. a 1,3-dipolar cycloaddition click reaction) described herein. In one embodiment, a copper catalyst is used to achieve the click reaction. In one embodiment, the click reactions (e.g. a 1,3-dipolar cycloaddition click reaction) described herein are achieved with a Cu(I) metal catalyst. Other suitable methods include, but are not limited to high pressure reaction conditions or irradiation such as by microwaves. In certain embodiments, electron-deficient alkynes can also be used to achieve the click reactions (e.g. a 1,3-dipolar cycloaddition click reaction) described herein (Li et al., *Tetrahedron Lett.* 2004, 45, 3143-3146; herein incorporated by reference in its entirety).

In specific embodiments, the click reaction (e.g. a 1,3-dipolar cycloaddition click reaction) conditions can be performed at a pH of from about 0 to about 8, from about 1 to about 7, from about 2 to about 6, from about 3 to about 5, or from about 4 to about 8. In another embodiment, the click reaction (e.g. a 1,3-dipolar cycloaddition click reaction) can be performed in an aqueous media or in a biological fluid (e.g. water, dimethylformamide, dimethylsulfoxide, and alcohols, diols, and glycerols or any combination thereof) or in the presence of cells, biomolecules, tissues, and salts.

The alkyne functional surface (≡) can be regenerated by deprotection of the protected alkyne groups. Deprotection of the terminal silyl-alkyne groups can be performed by any method known in the art.

In still other embodiments, the macromolecule and/or branch may be comprised of a click moiety at one terminus and a non-click moiety at another terminus Thus, in some embodiments the non-click moiety can be converted to a click moiety at the desired time point in preparation for click chemistry reactions at the newly installed click moiety. Thus, in one example, the macromolecule and/or branch is comprised of at least one non-click moiety such as halogen, for example, which is then displaced with azide to form a terminal azide on the macromolecule and/or branch. The newly installed terminal azide may then further participate in click chemistry reactions.

There is no requirement according to the methods described herein that any subsequent macromolecular layer (or heterotrifunctional branch layer) be the same as that used for the previous macromolecular layer (or heterotrifunctional branch layer) or in any other macromolecular (or heterotrifunctional branch) layer in the dendrimeric composition. Rather, the layering process can be applied to prepare covalently bound multilayers from any desired sequence of macromolecules or branches by repetition of the process described herein. In fact, the chemoselective nature of the click coupling reactions employed herein allows that each subsequent layer can be selected according to one or more desired properties (e.g. molecular weight, hydrophobicity, length . . . etc) of the macromolecule or branch. Another aspect of the methods described herein is that because the macromolecules or branches are joined by a covalent bond, each functionalized layer can be washed and any non-covalently linked species can be eliminated.

The multilayer dendrimeric compositions described herein can comprise any number of macromolecular layers. In certain embodiments, the multilayer polymeric composition will have one macromolecular layer, two macromolecular layers, three macromolecular layers, four macromolecular layers, five macromolecular layers, six macromolecular layers, seven macromolecular layers, eight macromolecular layers, nine macromolecular layers, or ten or more macromolecular layers. The number of polymer macromolecular layers may in part be dictated by the end use application of the multilayer dendrimeric composition.

The multilayer dendrimeric composition described herein can comprise any number of heterotrifunctional branch layers. In certain embodiments, the multilayer dendrimeric composition will have one branch layer, two branch layers, three branch layers, four branch layers, five branch layers, six branch layers, seven branch layers, eight branch layers, nine branch layers, or ten or more branch layers. The number of heterotrifunctional branch layers may in part be dictated by the end use application of the multilayer dendrimeric composition.

The α-silylalkyne, ω-azide-macromolecules described herein can be readily prepared by any method known in the art, including, but not limited to atom transfer radical polymerization (ATRP) (Wang and Matyjaszewski. *Macromolecules* 28, 7901-7910 (1995); herein incorporated by reference in its entirety. For example, the macromolecules can be readily prepared by use of a trimethylsilane protected alkyne-functional ATRP initiator to polymerize the monomers. Conversion of the resultant terminal bromine groups to azides can be performed by the addition of sodium azide. The macromolecules described herein can also be readily prepared by any method known in the art, including those methods described in the examples.

The macromolecules suitable for use with the methods described herein can comprise any macromolecular backbone terminated at one end with an azide group ($N_3$) and on the other end with a silane protected alkyne group, and can have any type of backbone (e.g., charged or functional) that can be employed using click chemistry in dendrimeric assembly. Other macromolecules suitable for use with the methods described herein can comprised any macromolecular backbone terminated at one end with a click moiety functional group and on the other end with a non-click moiety functional group. Exemplary macromolecules are illustrated in FIGS. 16-20. Further exemplary macromolecules are provided, for example, in WO 10/053,993; herein incorporated by reference in its entirety. One skilled in the art will understand that the type of macromolecular backbone selected for use can be selected from a range of macromolecular backbones depending on the intended end use of the dendrimeric composition generated by the methods described herein. Exemplary polymer backbones suitable for use with the methods described herein include, but are not limited to polymers, copolymers, polyelectrolyte polymers such as poly(acrylic acid) and poly(lysine), polyethers such as polyethylene glycol, polyesters such as poly(acrylates) and poly(methacrylates), polyalcohols such as poly(vinyl alcohol), polyamides such as poly(acrylamides) and poly(methacrylamides), biocompatible polymers, biodegradable polymers, polypeptides, polynucleotides, polycarbohydrates and lipopolymers.

In one embodiment, the same polymer material can be used in each macromolecular layer. In another embodiment, different polymer materials can be used for each macromolecular layer. Further, one skilled in the art will understand that the use of one polymer in a given macromolecular layer of the dendrimeric composition generated by the methods described herein will not preclude the use of the same polymer in another macromolecular layer of the multilayer dendrimeric composition.

Figure 17:
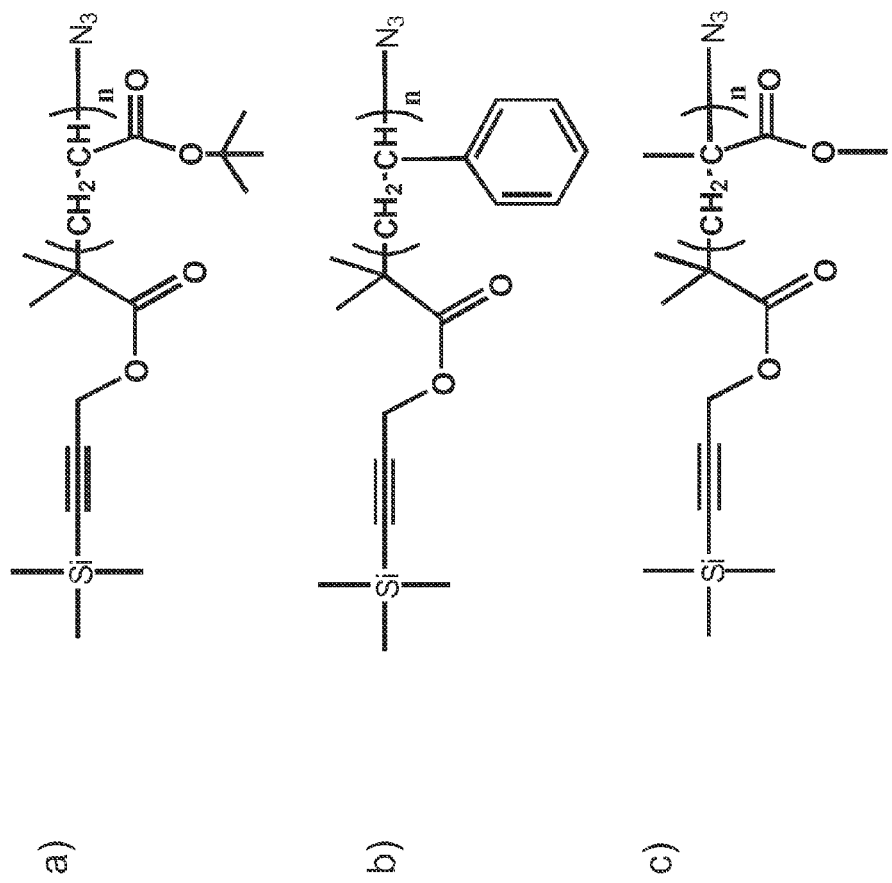
FIG. 17. Structure of a) α-TMS-alkyne-ω-azide-poly(tert-butyl acrylate) (α-azido-ω-TMS-alkyne-PtBA), b) α-TMS-alkyne-ω-azide-poly(polystyrene) (α-azido-ω-TMS-alkyne-PS), and c) α-TMS-alkyne-β-azide-poly(methyl methacrylate) (α-azido-ω-TMS-alkyne-PMMA).

In certain embodiments, the polymer backbone can be an α-alkyne-trimethylsilyl-ω-azide-poly(styrene) backbone, an α-alkyne-trimethylsilyl-ω-azide-poly(tert-butyl acrylate) backbone or an α-alkyne-trimethylsilyl-ω-azide-poly(methyl methacrylate) backbone. Accordingly, in certain embodiments, the macromolecules used in conjunction with the methods described herein can be an α-alkyne-trimethylsilyl-ω-azide-poly(styrene) terminated at one end with an azide group ($N_3$) and on the other end with a silane protected alkyne group such as, for example, trimethylsilane (TMS-≡) (TMS-alkyne-PS-$N_3$), an α-alkyne-trimethylsilyl-ω-azide-poly(tert-butyl acrylate) terminated at one end with an azide group ($N_3$) and on the other end with a trimethyl silane protected alkyne group (TMS-≡) (TMS-alkyne-PtBA-$N_3$), or an α-alkyne-trimethylsilyl-ω-azide-poly(methyl methacrylate) terminated at one end with an azide group ($N_3$) and on the other end with a trimethylsilane protected alkyne group (TMS-≡) (TMS-alkyne-PMMA-$N_3$). Molecular characteristics of some macromolecules suitable for use with the methods described herein are presented in Table 1 and their chemical structures are shown in FIG. 17.

TABLE 1

Number molecular weights ($M_n$), weight average molecular weights ($M_w$) and polydispersity indices (PDI) of the polystyrene, poly(tert-butyl acrylate) and poly(methyl methacrylate) HetBi polymers determined by gel permeation chromatography (GPC). Adjusted $M_n$ values employ a universal calibration based upon literature values of Mark-Houwink-Sakurada parameters to correct the GPC molecular weight for hydrodynamic volume effects.

| Polymer Code | $M_n$ | $M_w$ | PDI | Adjusted $M_n$ |
| --- | --- | --- | --- | --- |
| TMS-alkyne-PS-$N_3$ | 21,500 | 24,000 | 1.12 | 21,500 |
| TMS-alkyne-PtBA-$N_3$ | 17,000 | 20,000 | 1.17 | 22,170 |
| TMS-alkyne-PMMA-$N_3$ | 12,000 | 20,000 | 1.67 | 14,600 |

Examples of polymeric backbones suitable for use with the methods described herein, include, but are not limited to organic monomers, organic polymers, polymer precursors, thermoplastic polymers, a blend of thermoplastic polymers, thermosetting polymers or any combination thereof. The substrate can also comprise a blend of monomers, polymers, copolymers, terpolymers, and can be a oligomer, a homopolymer, a copolymer, a block copolymer, an alternating block copolymer, a random polymer, a random copolymer, a random block copolymer, a graft copolymer, a star block copolymer, a dendrimer, or the like.

Exemplary thermoplastic polymers that can be used as polymer backbones for the polymers described herein, include, but are not limited to acrylonitrile butadiene styrenes, acrylics, celluloids, cellulose acetates, cycloolefin copolymers, ethylene-vinyl acetates, ethylene vinyl alcohols, fluoroplastics, ionomers, polyacetals, polyacrylates, polyacrylonitriles, polyamides, polyamide-imides, polyaryletherketones, polybutadienes, polybutylenes, polybutylene terephthalates, polycaprolactones, polychlorotrifluoroethylenes, polyethylene terephthalates, polycyclohexylene dimethylene terephthalates, polycarbonates, polyhydroxyalkanoates, polyketones, polyesters, polyethylenes, polyetheretherketones, polyetherketoneketones, polyetherimides, polyethersulfones, polyethylenechlorinates, polyimides, polylactic acids, polymethylpentenes, polyphenylene oxides, polyphenylene sulfides, polyphthalamides, polypropylenes, polystyrenes, polysulfones, polytrimethylene terephthalates, polyurethanes, polyvinyl acetates, polyvinyl chlorides, polyvinylidene chlorides, styrene-acrylonitriles or any combination thereof.

Examples of cationic polymers that can be used as polymer backbones for the polymers described herein are any polymers having protonated heterocycles attached as pendant groups and include, but are not limited to polyethylene glycol poly-L-lysine (PLL), poly(D-lysine), poly(ornithine), poly(arginine), poly(histidine), nonpeptide polyamines such as poly(aminostyrene), poly(aminoacrylate), poly (N-methyl aminoacrylate), poly (N-ethylaminoacrylate), poly(N,N-dimethyl aminoacrylate), poly(N,N-diethylaminoacrylate), poly(aminomethacrylate), poly(N-methyl amino-methacrylate), poly(N-ethyl aminomethacrylate), poly(N,N-dimethyl aminomethacrylate), poly(N,N-diethyl aminomethacrylate), poly(ethyleneimine), polymers of quaternary amines, such as poly(N,N,N-trimethylaminoacrylate chloride), poly(methyacrylamidopropyltrimethyl ammonium chloride), and natural or synthetic polysaccharides such as chitosan.

Examples of anionic polymers that can be used as polymer backbones for the polymers described herein are any polymer having carboxylic acid groups attached as pendant groups and include, but are not limited to alginate, carrageenan, furcellaran, pectin, xanthan, hyaluronic acid, heparin, heparan sulfate, chondroitin sulfate, dermatan sulfate, dextran sulfate, poly(meth)acrylic acid, oxidized cellulose, carboxymethyl cellulose and crosmarmelose, synthetic polymers and copolymers containing pendant carboxyl groups, and polyaminoacids of predominantly negative charge, such as polyaspartic acid, polyglutamic acid, and copolymers thereof.

Examples of nonionic polymers that can be used as polymer backbones for the polymers described herein are uncharged polymers or from a combination of charged and uncharged polymers and include, but are not limited to dextran, dextran sulfate, diethylaminoethyl (DEAE)-dextran, hydroxyethyl cellulose, ethyl(hydroxyethyl) cellulose, acrylamide, polyethylene oxide, polypropylene oxide, polyethylene oxide-polypropylene oxide copolymers, $PAAN_a$, Ficoll, polyvinylpyrrolidine, and polyacrylic acid.

Examples of amphoteric polymers that can be used as polymer backbones for the polymers described herein are include, but are not limited to acrylic acid (AA), DMAEMA (dimethylaminoethyl methacrylate), APA (2-aminopropyl acrylate), MorphEMA (morpholinoethyl methacrylate), DEAEMA (diethylaminoethyl methacrylate), t-ButylAEMA (t-butylaminoethyl methacrylate), PipEMA (piperidinoethyl methacrylate), AEMA (aminoethyl methacrylate), HEMA (2-hydroxyethyl methacrylate), MA (methyl acrylate), MAA (methacrylic acid) APMA (2-aminopropyl methacrylate), AEA (aminoethyl acrylate).

Polysaccharides can also be used as polymer backbones for the polymers described herein. Exemplary polysaccharides suitable for use with the methods disclosed herein include, but are not limited to, starch, cellulose, glycogen or carboxylated polysaccharides such as alginic acid, pectin, carboxymethyl amylose, hyaluronan or carboxymethylcellulose.

The use of non-linear polymer backbones can be to increase the areal density of functional groups at an interface of interest. For example, if the areal density of surface functional groups is insufficient to attach a subsequent macromolecular or branch layer, it can be increased by addition of a macromolecular layer of click functional dendrimers.

Other polymers suitable for use as polymer backbones for the polymers described herein include polymers having hydrolyzable or biochemically cleavable groups incorporated into the polymer network structure. Exemplary polymers having hydrolyzable or biochemically cleavable groups incorporated into the polymer network structure include but are not limited to those polymers having hydrolyzable or biochemically cleavable groups incorporated into the polymer network structure described in U.S. Pat. Nos. 5,626,863, 5,844,016, 6,051,248, 6,153,211, 6,201,065, 6,201,072, each of which are incorporated herein by reference in their entireties.

Other polymers can also be used as polymer backbones for the polymers described herein. Exemplary other polymers suitable for use with the methods disclosed herein include, but are not limited to, ABS polycarbonate polymer blends, acetal homopolymers, acrylate and methacrylate resins, acrylic fibers, acrylic polyelectrolytes, acrylic resins, acrylonitrile-butadiene-styrene copolymers, acrylonitrile-butadiene-styrene graft copolymers, acrylonitrile-butadiene-styrene terpolymers, acrylonitrile-polybutadiene-styrene graft copolymers, ampholytic polyelectrolytes, aromatic polyamides, aromatic polyesters, butadiene copolymers, butadiene-acrylonitrile copolymers, carboxylated fluoropolymers, cellulose acetates, cellulose acetate-butyrates, cellulose acetate-propionates, cellulose nitrates, cellulose nitrate plasticized with camphors, cellulose propionates, chlorinated natural rubbers, chlorinated polyethylenes, chlorinated rubbers, cis-1,4-polybutadienes, cis-1,4-polyisoprenes, copolyamides, copolyester based on 1,4-cyclohexylene glycol and a mixture of terephthalic and isophthalic acids, copolymer from 90% isobutylene and 10% styrene, copolymers of vinylidene chloride, vinyl chloride and acrylonitriled, diallyl phthalate resins, elastomeric polyamides, copolyamides, epichlorohydrin rubbers, epoxide resins, epoxy resins, ethylcelluloses, ethylene-chlorotrifluoroethylene copolymers, ethylene-methyl acrylate copolymers, ethylene-propylene copolymers, ethylene-propylene-diene terpolymers, ethylene-vinylacetate copolymers, farbenfabrik ion-exchange resins, fatty polyamides, fluoroelastomers, fluoropolymers, glass-reinforced poly(ethylene terephthalate), hydroxyethylcelluloses, ion-exchange resins, ionic membrane (based on fluoropolymer), ionomers, liquid crystal polymers, LLDPE, low-density polyethylenes, melamineformaldehyde resins, melamine-formaldehyde resins, methyl celluloses, modified polypropylenes, nylon-11, nylon-12, nylon-6, nylon-6,6, PE, cross-linked by radiation, perfluoroalkoxy copolymers, persulfonated fluoropolymers, petrochemcial polypropylenes, phenol-formaldehyde resins, phenol-formaldehyde resins and molding compounds, photopolymer systems, polyesters, polimides, poly (ethylene terephthalate), poly (methyl methacrylate) dental resins, poly (vinyl alcohol) fibers, poly(butylenes terephthalate), poly(ethylene oxide), poly(ethylene terephthalate), poly(methyl methacrylate), poly(m-phenylene isophthalimide), poly(phenylene oxide) blends, poly (phenylene oxide)-polystyrene blends, poly(p-hydroxybenzoic acid ester), poly(tetramethylene terephthalate), poly (vinyl acetate), poly(vinyl alcohol), poly(vinyl butyral), poly (vinyl chloride), poly(vinyl chloride) (PVC), poly(vinyl chloride) and blends, poly(vinyl fluoride), poly(vinyl fluoride), poly(vinyl isobutyl ether), poly(vinylidene fluoride), poly-4-methylpent-1-ene, polyacetals, polyacrylates, polyacrylic esterimides, polyacrylonitriles, polyamides, polyamide fiber from bis(paminocyclohexyl)methane and dodecanedioic acids, polyamide/abs blends, polyamide-imides, polyarylatess, polyaryletherketones, polyaryletherketones, polyarylethersulfones, polyarylsulfones, polybismaleinimides, polybutadienes, polycarbonates, polycarbonate/abs blends, polychloroprenes, polychlorotrifluoroethylenes, polyesters, polyesterimides, polyether ketones, polyether sulfones, polyetherimides, polyethylenes, polyethylene terephthalates, polyethyleneimines, polyethylenes, polyhydroxy compound for isocyanate cross-linking, polyimides, polyisobutylenes, polyisocyanurates, polyisoprenes, polyoxymethylenes, polyphenylene ethers, polyphenylene sulfides, polyphenyleneethers, polypropylenes, polystyrenes, polysulfides, polysulfones, polytetrafluoroethylenes, polyurethanes, polyvinylidene fluorides, rubber hydrochlorides, silicones, spandex fibers, styrene homopolymers, styrene-acrylonitrile copolymers, styrene-butadiene copolymers, styrene-dienestyrene triblock elastomers, styrene-polybutadiene graft copolymers, sulfochlorinated polyethylenes, tetrafluoroethylene-propylene+cure site monomer terpolymers, tetrafluoroethylene-ethylene copolymers, tetrafluoroethylene-hexafluoropropylene copolymers, thermoplastic polyester elastomers, thermoplastic polyurethane elastomers, thermoplastic polyurethanes, thermoplastic styrene block copolymers, trans-1,4-polybutadienes, transparent amorphous polyamides, transparent polyamides, unsaturated polyester resins, urea-formaldehydes, vinyl chloride-acrylonitrile copolymers, vinyl chloride-vinylidene chloride-acrylonitrile copolymers, vinylidene fluoride-chlorotrifluoroethylene copolymers, vinylidene fluoride-hexafluoropropylene copolymers, and vinylidene fluoride-hexafluoropropylene-tetrafluoroethylene terpolymers.

Figure 21:
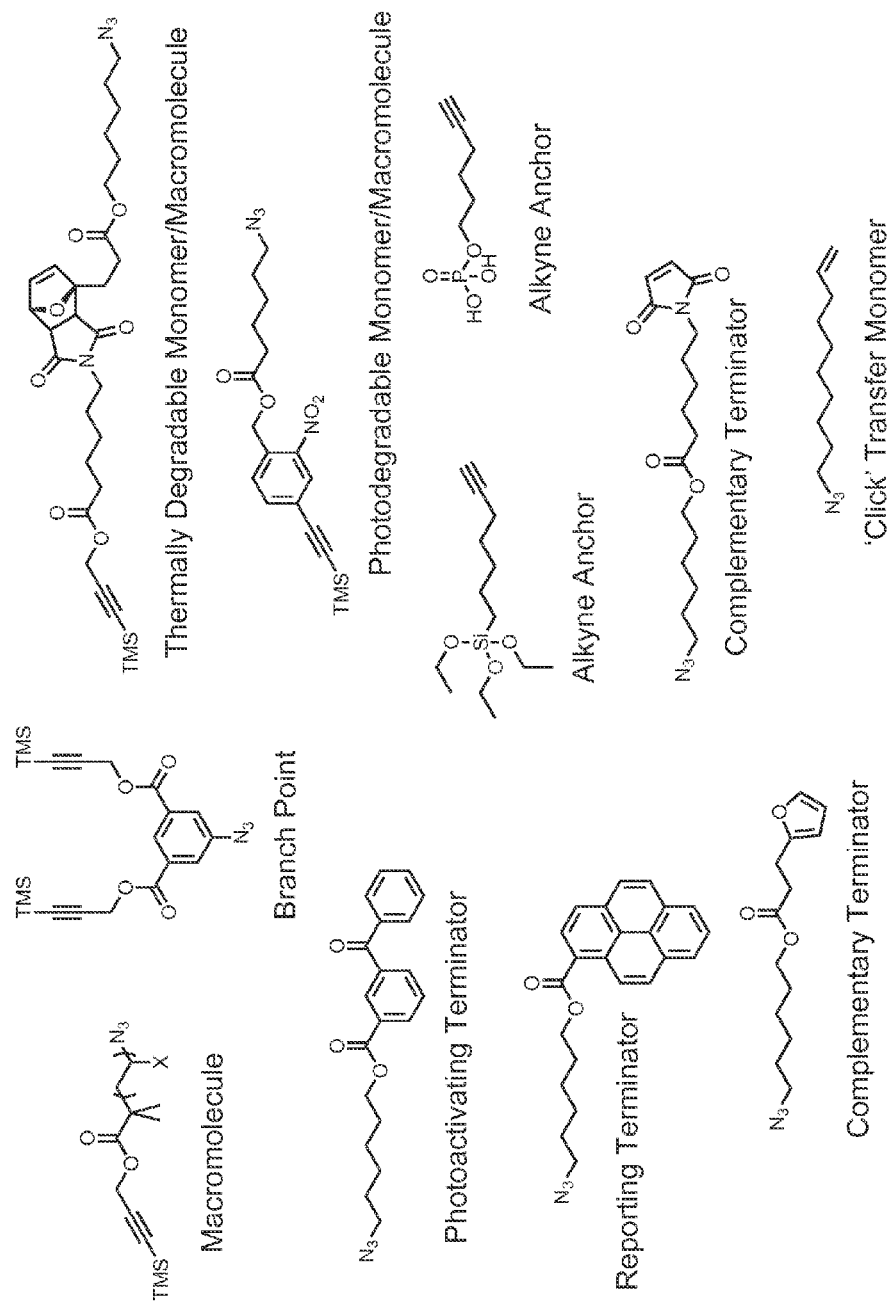
FIG. 21. Exemplary toolkit components for click chemistry.

Still other exemplary embodiments of toolkit components suitable for incorporation into the compounds and compositions herein are shown in FIG. 21.

The macromolecules may further comprise additional functional groups, such as, for example organic substituents known in the art. In one embodiment, the substituents may be designated as one or more "X" groups as exemplified on the macromolecules herein. In one embodiment, X is selected from hydrogen, alkyl, cycloalkyl, haloalkyl and halogen. In one embodiment, X is hydrogen. In one embodiment, X is alkyl. In one embodiment, X is halogen. In one embodiment, X is haloalkyl. In one embodiment, X is cycloalkyl. These and other embodiments will be evident to one of skill in the art.

The macromolecules may also contain monomeric subunits, such as, for example subunits that are repeated in the macromolecule. In one embodiment, the subunits are identified by parentheses on the macromolecular drawings, and are repeated n times. In certain embodiments, n=about 1-1000; about 1-500; about 1-200; about 1-100; about 1-50; about 1-30; about 1-20; about 1-10; about 1-5; about 1-2; about 2-10; about 10-20; about 20-30; about 30-40; about 40-50; about 50-75; about 75-100; about 100-200; about 200-300; about 300-400; about 400-500; about 500-1000; about 1,000-2,000; about 2,000-3,000; about 3,000-4,000; about 4,000-5,000; and about 5,000-10,000, where any stated values can form a lower and/or upper endpoint of a numerical range as appropriate or where any of the lower limits can be combined with any of the upper limits.

The molecular weights of the macromolecules described herein can be of any molecular weight suitable for use in generating and using the multilayer macromolecular compositions described herein. In certain embodiments, the macromolecule can have a molecular weight of from about 100 Da to about 2,000,000 Da. In certain embodiments, the molecular weight of the macromolecule is about 100 Da to about 500 Da; about 500 Da to about 1000 Da; about 1 kDa to about 2 kDa; about 2 kDa to about 3 kDa; about 3 kDa to about 4 kDa; about 4 kDa to about 5 kDa; about 5 kDa to about 10 kDa; about 10 kDa to about 20 kDa; about 20 kDa to about 30 kDa; about 30 kDa to about 40 kDa; about 40 kDa to about 50 kDa; about 50 kDa to about 75 kDa; about 75 kDa to about 100 kDa; about 100 kDa to about 200 kDa; about 200 kDa to about 250 kDa; about 250 kDa to about 300 kDa; about 300 kDa to about 350 kDa; about 350 kDa to about 400 kDa; about 400 kDa to about 450 kDa; about 450 kDa to about 500 kDa; about 500 kDa to about 550 kDa; about 550 kDa to about 600 kDa; about 600 kDa to about 650 kDa; about 650 kDa to about 700 kDa; about 700 kDa to about 750 kDa; about 750 kDa to about 800 kDa; about 800 kDa to about 850 kDa; about 850 kDa to about 900 kDa; about 900 kDa to about 950 kDa; about 950 kDa to about 1 kDa; about 1,000 kDa to about 1,500 kDa; or about 1,500 kDa to about 2,000 kDa, where any stated values can form a lower and/or upper endpoint of a molecular weight range as appropriate or where any of the lower limits can be combined with any of the upper limits.

The molecular thickness of the multilayer dendrimeric compositions described herein can be of any thickness and may in part be dictated by the end use application of the multilayer dendrimeric composition. In some embodiments, the multilayer dendrimeric composition can have a thickness from about 1 nm to about 100 nm, from about 2 nm to about 50 nm, from about 3 nm to about 25 nm, from about 4 nm to about 15 nm, from about 5 nm to about 10 nm. In some embodiments, the multilayer dendrimer composition can have a thickness from about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or about 16 nm or greater.

In certain embodiments, the multilayer dendrimer compositions can include a polymer comprising one or more effector moieties. In certain embodiments the polymer in one or more layers of the multilayer dendrimeric compositions comprises an effector moiety. In certain embodiments, the multilayer dendrimeric compositions can include a surface macromolecular layer comprising a macromolecule comprising one or more effector moieties. As used herein, the term "surface macromolecular layer" refers to the surface macromolecular layer formed after deposition of a macromolecule or branch according to the methods disclosed herein. In one embodiment, the macromolecule in a surface macromolecular layer will have at least one terminus which is not covalently bound to a substrate or to another macromolecule. In one embodiment, the at least one terminus of the macromolecule in a surface macromolecule layer that is not covalently bound to a substrate or to another hetero-bifunctional macromolecule is a silane protected alkyne group terminus.

The effector moiety can be any type of molecule. For example, the effector moiety can be a polypeptide (e.g. an enzyme or an antibody or a fragment thereof), an oligonucleotide, a lipid, a carbohydrate, a small molecule, a ligand, a catalyst, a dye, a label, a sensor, an analyte or any combination thereof. In some embodiments, the effector moiety functions as a cleavable group. In some embodiments, the effector moiety functions as a binding site. In other embodiments, the effector moiety can be a thermochemically reactive group, a photochemically reactive group, or mixtures thereof. Suitable thermochemically reactive group and photochemically reactive groups are described in U.S. Pat. Nos. 5,858,653 and 6,465,178 and in U.S. Published Patent Application 20030113792 (Ser. No. 09/521,545), the entire disclosures of which are each incorporated herein by reference.

Many methods for attaching effector moieties to polymer backbones are known in the art and any suitable method can be used. Suitable methods include, but are not limited to those described in Lvov et al, J. Phys. Chem., 1993, 97, 13773; Lvov et al, Langmuir, 1996, 12, 3038; Cooper, et al, Langmuir, 1995, 11, 2713; Locklin et al, Langmuir, 2002, 18, 877; Zhang et al, Chem. Commun, 2007, 1395; Sukhorukov et al, Colloids Surf, A, 1998, 137, 253; Lvov and Caruso, Anal. Chem., 2001, 73, 4212; Crisp and Kotov, Nano Lett., 2003, 3, 173; Lvov et al, Macromolecules, 1993, 26, 5396; Onda et al, Biotechnol. Bioeng., 1996, 51, 163; Caruso et al, Langmuir, 2000, 16, 9595; Schuler and Caruso, Biomacromolecules, 2001, 2, 921; Cortez et al, Adv. Mater., 2006, 18, 1998; each of which are incorporated by reference in their entirety.

In some embodiments, the effector moiety is a biologically active molecule. Exemplary biologically active molecules that can serve as an effector moiety in the multilayer dendrimeric compositions described here include, but are not limited to anti-inflammatory agents, anti-pyretic agents, steroidal and non-steroidal drugs for anti-inflammatory use, hormones, growth factors, contraceptive agents, antivirals, antibacterials, antifungals, analgesics, hypnotics, sedatives, tranquilizers, anti-convulsants, muscle relaxants, local anesthetics, antispasmodics, antiulcer drugs, peptidic agonists, sympathomimetic agents, cardiovascular agents, antitumor agents, oligonucleotides and their analogues and so forth.

In some embodiments, the effector moiety is a polynucleotide probe useful for binding or detecting a polypeptide, or another polynucleotide. Accordingly, in some embodiments, the multilayer dendrimeric compositions can be used as a DNA microarray suitable for detecting hybridization of complementary target DNA or DNA fragments in solution. In some embodiments, the effector moiety is an antibody useful for binding a polypeptide. Accordingly, in some embodiments, the multilayer dendrimeric compositions can be used as an immunoarray suitable for detecting binding of an antigen to the effector moiety on the surface of the multilayer dendrimeric compositions described herein.

In a further embodiment, the effector moiety is a fluorescence dye or a label (e.g. a fluorophore). Exemplary fluorescence dyes or labels that can serve as an effector moiety in the multilayer dendrimeric compositions described here include but are not limited to, cresyl fast violet, cresyl blue violet, rhodamine-6G, para-aminobenzoic acid, phthalic acids, erythrosine, aminoacridine. fluorescein and its derivatives; rhodamine and its derivatives; cyanine and its derivatives; coumarin and its derivatives; Cascade Blue and its derivatives; Lucifer Yellow and its derivatives; BODIPY and its derivatives; and the like. Exemplary fluorophores include indocarbocyanine (C3), indodicarbocyanine (C5), Cy3, Cy3.5, Cy5, Cy5.5, Cy7, Texas Red, Pacific Blue, Oregon Green 488, Alexa Fluor 488, Alexa Fluor 532, Alexa Fluor 546, Alexa Fluor 568, Alexa Fluor 594, Alexa Fluor 647, Alexa Fluor 660, Alexa Fluor 680, JOE, Lissamine, Rhodamine Green, BODIPY, fluorescein isothiocyanate (FITC), carboxy-fluorescein (FAM), phycoerythrin, rhodamine, dichlororhodamine (dRhodamine), carboxy tetramethylrhodamine (TAMRA), carboxy-X-rhodamine (ROX), LIZ, VIC, NED, PET, SYBR, PicoGreen, RiboGreen, and the like. Descriptions of fluorophores and their use, can be found in, among other places, R. Haugland, Handbook of Fluorescent Probes and Research Products, 9th ed. (2002), Molecular Probes, Eugene, Oreg.; M. Schena, Microarray Analysis (2003), John Wiley & Sons, Hoboken, N.J.; Synthetic Medicinal Chemistry 2003/2004 Catalog, Berry and Associates, Ann Arbor, Mich.; G. Hermanson, Bioconjugate Techniques, Academic Press (1996); and Glen Research 2002 Catalog, Sterling, Va.; each herein incorporated by reference in its entirety. Near-infrared dyes are expressly within the intended meaning of the terms fluorophore and fluorescent reporter group.

Other polymers suitable for use as polymer backbones include high temperature resistant polymers, fire resistant polymers, liquid crystal polymers (e.g. thermotropic main chain liquid crustal polymers, side-chain liquid crystal polymers, andral nematic liquid crystal polymers), electroactive polymers (e.g. Filled polymers, inherently conductive polymers, photoconductive polymers, polymers used in fiber optics, Languir-Blodgett Films, Piezo- and pyroelectric polymers and polymeric electrolytes), polymers in photoresist applications (e.g. negative photoresists, positive resists, electron beam resists, and plasma-developable photoresists), photoresists used in applications for printing (e.g. polymers used in printing plates, polymers used in photoengraving, polymers used in printed circuits, polymers used in collotype and proofing systems), polymers used in optical information storage, polymers used in adhesives (e.g. solvent-based adhesives, water-based adhesives, hot melt adhesives, radiation-curable adhesives), degradable polymers (e.g. polymers used in packaging applications, polymers used in medical and related applications), ionic polymers (e.g. ionomers, and polyelectrolytes), scavenger resins, synthetic polymer membranes (e.g. polymers used in membrane preparation and polymers used in membrane modules), polymers used in hydrogels (e.g. smart polymers), dendritic polymers, shape memory polymers, microencapsulation polymers, polymer nanocomposites, wood-polymer composites, and polymerization-filed composite as well as polymers described in Industrial Polymers, Specialty Polymers, and Their Applications, By Manas Chanda, Salil K. Roy CRC Press, 2008, which is included by reference in its entirety.

Still other embodiments for continued assembly and characterization of various architectural dendrimeric structures, including growth of polymeric dendrons from surfaces such as, for example, nanoparticles, are within the scope of this invention. Additional toolkit components useful in the design and construction of the compounds and compositions herein include photodegradable macromolecules or monomers, photodegradable cores for dendron release, thermally degradable monomers, and additional heterobifunctional macromolecules.

The following examples illustrate the present invention, and are set forth to aid in the understanding of the invention, and should not be construed to limit in any way the scope of the invention as defined in the claims which follow thereafter.

EXAMPLES

Example 1

Three HetBi macromolecule polymers (M) were synthesized to illustrate the method: α-alkyne-trimethylsilane-ω-azide-poly(styrene) (TMS-alkyne-PS-$N_3$), α-alkyne-trimethylsilane-ω-azide-poly(tert-butyl acrylate) (TMS-alkyne-PtBA-$N_3$) and α-alkyne-trimethylsilane-ω-azide-poly (methyl methacrylate) (TMS-alkyne-PMMA-$N_3$). These polymers can be readily prepared by use of a trimethylsilane protected alkyne-functional ATRP initiator to polymerize the monomers. Conversion of the resultant terminal bromine groups to azides can be performed by the addition of sodium azide.

The exemplary polymers are prepared by atom transfer radical polymerization (ATRP) and have α-ω-bifunctional architecture.

Synthesis of a Protected Alkyne-Functional Initiator-TMS. In a 100 mL round bottom flask, 3-(trimethylsilyl)propargyl alcohol (5 g, 38.98 mmol), triethylamine ($Et_3N$ 3.93 g, 38.98 mmol) and 50 mL of dry $Et_2O$ were added and stirred in an ice-water bath for 20 min. Bromoisobutyryl bromide (7.8 g, 33.90 mmol) dissolved in 15 mL of dry $Et_2O$ was added drop-wise. After the addition was complete, the reaction was allowed to warm-up to 23° C. and stirring was continued for 24 h. The reaction mixture was poured into ice-water and the organic product was extracted with $CH_2Cl_2$. The organic phase was washed with 100 mL $H_2O$ (2×) and 100 mL brine (2×), and then dried over anhydrous $Na_2SO_4$. The solvent was distilled at 30° C. under reduced pressure on a rotary evaporator to yield a slightly yellow liquid that was purified by vacuum distillation to yield 5.3 g of final product (54%), propanoic acid, 2-bromo-2-methyl-, 3-(trimethylsilyl)-2-propynyl ester), a protected alkyne-functional initiator for atom transfer radical polymerization (ATRP). $^1$H-NMR δ 4.78 (s, 2H, C$\underline{H}_2$), 1.94 (s. 6H, $CH_3$), 0.08 (s, 9H, Si(C$\underline{H}_3$)$_3$. $^{13}$C NMR δ 171.77 (C$\underline{C}$(O)O), 90.03 (Si-$\underline{C}$≡C), 98.55 ($\underline{C}$≡C—Si), 55.88 (O$\underline{C}$C(O)), 54.56 ($\underline{C}$($CH_3$)$_2$), 31.01 ($\underline{C}H_3$), −0.83 ($\underline{C}H_3$Si).

Synthesis of the Polymers

TMS-alkyne-PtBA-Br. The monomer, t-butyl acrylate (tBA) (99+% purity), was passed through a basic $Al_2O_3$ chromatographic column (flash) to remove inhibitor. Monomer (tBA, 2.5 g, 19.53 mmol), solvent (toluene, Acros, 99.8%, 1.5 mL), initiator ((TMS, 13.5 mg, 0.046 mmol), catalyst (CuBr, 8 mg, 0.051 mmol) and N,N,N',N',N''-pentamethyldiethylenetriamine (99% purity) ligand (PMDETA, 11.1 mg, 0.062 mmol) were weighed directly in a 25-mL Schlenk tube. After three freeze-pump-thaw cycles, the tube was filled with argon, and the reaction mixture was heated to 70° C. in an oil bath. The side arm of the tube was purged with argon for at least 5 minutes before it was opened for samples to be removed at predetermined times with an airtight syringe. Samples were dissolved in $CDCl_3$, and the conversion was measured by $^1$H-NMR. A part of the solution was injected into a Shimazu LC-10AT gel permeation chromatography system (GPC), equipped with a refractive index detector to measure the number-average and weight-average molecular weights relative to PS standards. Molecular weights were corrected for hydrodynamic volume effects by application of a universal calibration using Mark-Houwink-Sakurada parameters (PS: K=1.41 and a=0.7; PtBA: K=0.33 and a=0.8; PMMA: K=1.04 and a=0.697) and the following formula:

$$\log(M) = \frac{1}{1+a}\log\left(\frac{K_{Ref}}{K}\right) + \frac{1+a_{Ref}}{a}\log(M_{Ref}) \quad (1)$$

Once the desired conversion was achieved, the Schlenk tube was removed from the oil bath, allowed to reach room temperature and the polymerization mixture diluted with $CH_2Cl_2$. This solution was passed through a basic alumina flash column, the catalyst-free mixture was collected and solvent was removed under reduced pressure using a rotary evaporator. Polymer was recovered by filtration after precipitation of a concentrated polymer solution in $CH_2Cl_2$ with a MeOH/$H_2O$ mixture (7:3 v/v).

Figure 18:
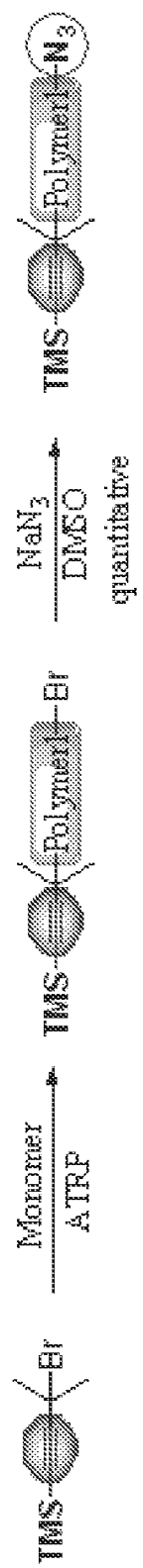
FIG. 18. Exemplary synthetic scheme for synthesis of macromolecules.
Figure 19:
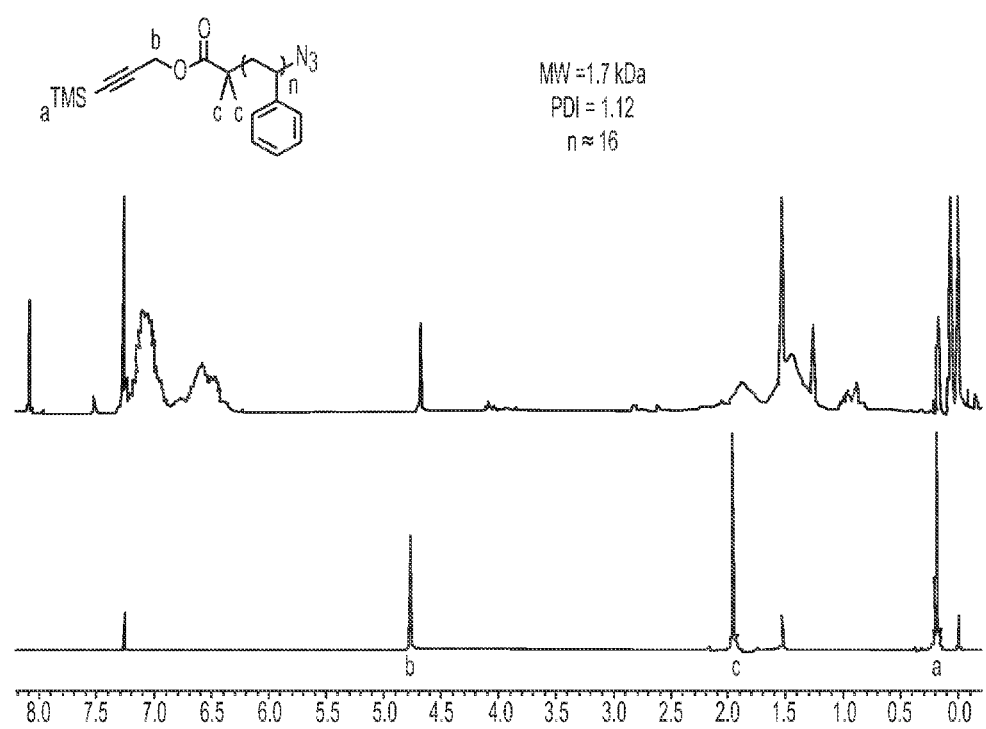
FIG. 19. Exemplary α-, ω-heterobifunctional macromolecule.
Figure 20:
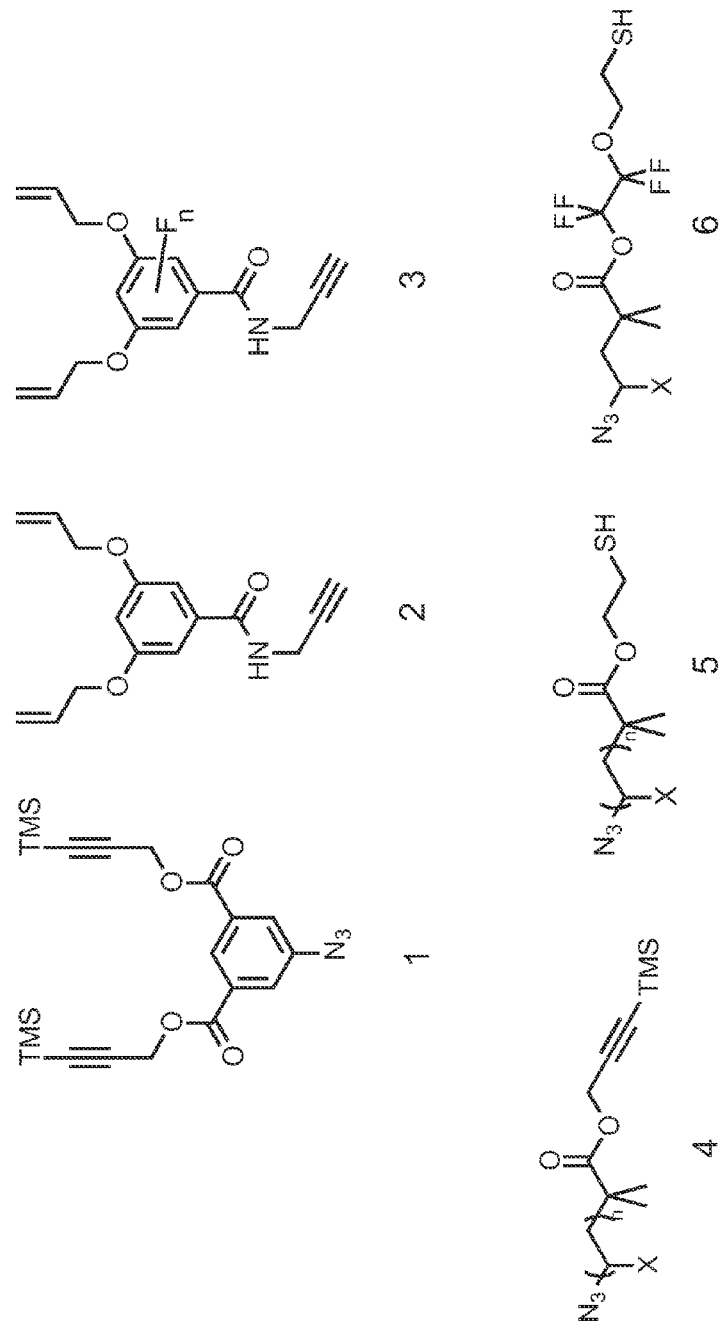
FIG. 20. Exemplary embodiments of branches (1-3) and macromolecules (4-6).

Exchange to (TMS-alkyne-PtBA-$N_3$): 1 g of TMS-PtBA-Br polymer was dissolved in 15 mL of dimethyl sulfoxide (DMSO) and 0.5 g of $NaN_3$ was added in a 2-neck round bottom flask equipped with a condenser. The slurry was allowed to stir overnight at refluxing temperature. Product was recovered by subjecting the slurry first to a filtration step to remove the excess $NaN_3$, followed by precipitation in a cooled MeOH/$H_2O$ mixture (7:3 v/v). The collected polymer was re-dissolved in 5 mL $CH_2Cl_2$ and this solution filtered to remove any insoluble solids and re-precipitated in the MeOH/$H_2O$ mixture. The collected polymer was dried and used without further purification. The overall synthesis scheme is depicted in FIG. 18. Similar procedures were used for the synthesis of TMS-PS-$N_3$ and TMS-PMMA-$N_3$. Structures for the 3 polymers are presented in FIG. 17. An exemplary polystyryl derived macromolecule is presented in FIG. 19. ATRP initiator from base promoted condensation of 2-bromoisobutyryl bromide with 3-(TMS)-propargyl alcohol is followed by ATRP and reaction with sodium azide in DMF to provide the polystyryl derivative.

Example 2

The synthesis of a heterotrifunctional branch molecule, 1, for the construction of dendrimeric materials using copper-catalyzed azide alkyne (CuAAC) 'click' chemistry begins with the diazotization of commercially available 5-aminoisophthalic acid followed by addition of sodium azide to form 5-azidoisophthalic acid (*Chem. Commun.* 2009, 1748-1750; herein incorporated by reference in its entirety) (FIG. 3). Subsequent carbodiimide coupling of the 5-azidoisophthalic acid with two equivalents of 3-trimethylsilyl-2-propyn-1-ol yielded 1 (FIG. 3). Compound I is intended to be used in combination with the α,azido-ω,TMS-alkyne polymer 4 (FIG. 20 and WO 10/053,993) to generate dendrimer and dendron structures similar to those shown, for example, in FIG. 22 and Table 2. For example, beginning with a bifunctional small molecule core ($C_2$) such as 1,8-nonadiyne, either a branch (B), 1, or a macromolecule (M), 4, can be reacted by copper-catalyzed azide-alkyne cycloaddition (CuAAC) to generate the first generation structures $C_2B$ or $C_2M$, respectively. The terminal alkyne ends are regenerated after deprotection of the TMS-alkynes using $K_2CO_3$ in $CH_2Cl_2$/MeOH. At each subsequent generation, either a branch (B) or a macromolecule (M) can be added to yield exemplary dendrimeric structures (FIG. 22 and Table 2). Although exemplary possibilities through the fourth generation are shown in the figure, there are several embodiments of potential structures available by varying the identity of the macromolecule at each generation (using different α,azido-ω,TMS-alkyne polymers such as α,azido-ω,TMS-alkyne-PtBA, α,azido-ω,TMS-alkyne-PnBA, α,azido-ω,TMS-allcyne-PS, etc.), by varying the functionality of the core (e.g. a trifunctional core $C_3$ could be commercially available tripropargylamine or a monofunctional core such as 10-undecyn-1-ol would generate a dendron with an alcohol focus), or by continuing to higher generations. The protected terminal alkyne on the branch unit and the macromolecule allows for control at each generation to prevent the uncontrolled growth of branched structures, and the orthogonality of the CuAAC reaction allows for other functional groups to be present in the polymer or on the core. All examples shown in FIG. 22 and Table 2 are made with same macromolecule, however different macromolecules would complicate architectures ($M_1$, $M_2$, etc.)

TABLE 2

First, second, third and fourth 'generation' dendrimers from a bifunctional ($C_2$) core with branches (B) and macromonomers (M).

| Generation | Combinations |
|---|---|
| First 'generation' dendrimers | $C_2B$ |
|  | $C_2M$ |
| Second 'generation' dendrimers | $C_2BB$ |
|  | $C_2BM$ |

TABLE 2-continued

First, second, third and fourth 'generation' dendrimers from a bifunctional ($C_2$) core with branches (B) and macromonomers (M).

| Generation | Combinations |
|---|---|
| Third 'generation' dendrimers | $C_2MB$ |
| | $C_2MM$ |
| | $C_2BBB$ |
| | $C_2BBM$ |
| | $C_2BMB$ |
| | $C_2BMM$ |
| | $C_2MBB$ |
| | $C_2MBM$ |
| | $C_2MMB$ |
| | $C_2MMM$ |
| Fourth 'generation' dendrimers | $C_2BBBB$ |
| | $C_2BBBM$ |
| | $C_2BBMB$ |
| | $C_2BBMM$ |
| | $C_2BMBB$ |
| | $C_2BMBM$ |
| | $C_2BMMB$ |
| | $C_2BMMM$ |
| | $C_2MBBB$ |
| | $C_2MBBM$ |
| | $C_2MBMB$ |
| | $C_2MBMM$ |
| | $C_2MMBB$ |
| | $C_2MMBM$ |
| | $C_2MMMB$ |
| | $C_2MMMM$ |

Similar possibilities exist for a trifunctional ($C_3$) or n-functional ($C_n$) core.
All examples made with same macromonomer, however different macromonomers would complicate architectures ($M_1$, $M_2$, etc.)

Example 3

In addition to the CuAAC system, branch points 2 and 3 (FIG. 20) have also been prepared, which are analogues to the $AB_2+CD_2$ system previously reported (Hawker et al., *Macromolecules* 2010, 43, 6625; herein incorporated by reference in its entirety). Instead of growing dendrimers where each generation is a small molecule, 2 and 3 may be used with the α,azido-ω,thiol polymers 5 and 6 (FIG. 20) in a $AB_2+CD$ system. Whereas the CuAAC system described above relies on protected alkynes to prevent uncontrolled growth, this system relies on the orthogonality of the CuAAC system with thiol-ene coupling chemistry. Beginning with a poly-ene core, growth proceeds by the addition of the thiol-end of a macromolecule. The resulting azide-terminus is then reacted with the alkyne of a branch point to make twice as many alkene ends as the core. Here again the density profile can be controlled by incorporating a small molecule alkene-yne (e.g. 1-penten-4-yne or 3-methyl-1-penten-4-yn-3-ol) to convert an azide terminus to a alkene terminus without increasing the number of growing ends. Additionally, the density can be controlled with a small molecule azidothiol (e.g. 11-azido-1-undecanethiol from the reaction of 11-bromo-1-undecanethiol and sodium azide) to convert an alkene terminus into a azide terminus. In each case, the high yielding 'click' reactions ensure growing dendrimer/dendron ends are not left unreacted.

Branch points 1, 2, and 3 were all designed around the notion that the aromatic protons of each could be used as an internal standard to monitor the growth of the dendrimers. In cases where the $^1H$ NMR signals are upfield, the downfield aromatic protons will be well separated and well resolved from the overwhelming polymer signals. In cases where the aromatic proton signals of a polymer overlap the aromatic proton signals of the branch unit, the fluorinated analogues of the branch point, 3, and the α,azido-ω,thiol polymers, 6, are employed to use $^{19}F$ NMR to monitor dendrimer growth.

Example 4

Other exemplary methods for synthesis of high molecular weight dendrimers are shown in FIG. 22 and Table 2. An element in the strategy is the synthesis of heterobifunctional (HetBi) polymer macromolecules (M) that are terminated at one end with an azide group ($N_3$) and on the other end with a silane protected alkyne group (for example, TMS-≡). HetBi functional polymer macromolecules (M) of this nature can be readily prepared by atom transfer radical polymerization (ATRP) (Wang and Matyjaszewski, *Macromolecules* 1995, 28, 7901-7910; herein incorporated by reference in its entirety), a living radical polymerization technique, as described herein. In one embodiment, the method begins by functionalizing a core (C) with surface alkyne groups (≡) via a macromolecule (M).

Covalent deposition of the first macromolecular layer involves a "click" reaction (i.e., 1,3-dipolar cycloaddition) between azide termini on the HetBi Polymer M and alkyne groups on the core (C). The result of the first reaction process is a core (C) coated with a macromolecule M that presents protected alkyne groups (TMS-≡) at the surface. An alkyne functional surface (≡) is then regenerated by deprotection of the protected alkyne groups on the macromolecule (M). Once surface alkyne groups are regenerated, a second macromolecule ($M_2$) (where the macromolecule is not necessarily the same as that used for the first macromolecular layer) is covalently attached by a click reaction between azide termini of second macromolecule ($M_2$) with the regenerated surface alkyne groups. Alternatively, a first branch ($B_1$) comprised of three terminal functional groups, wherein one is an azide and two are silylated alkynes, may be covalently attached by a click reaction between the azide terminus of first branch ($B_1$) with the surface alkyne groups of the first macromolecule (M). The construction process can be applied to prepare covalently bound multilayers from any desired combination of macromolecules and/or branches by repeating this generalized process.

Figure 23:
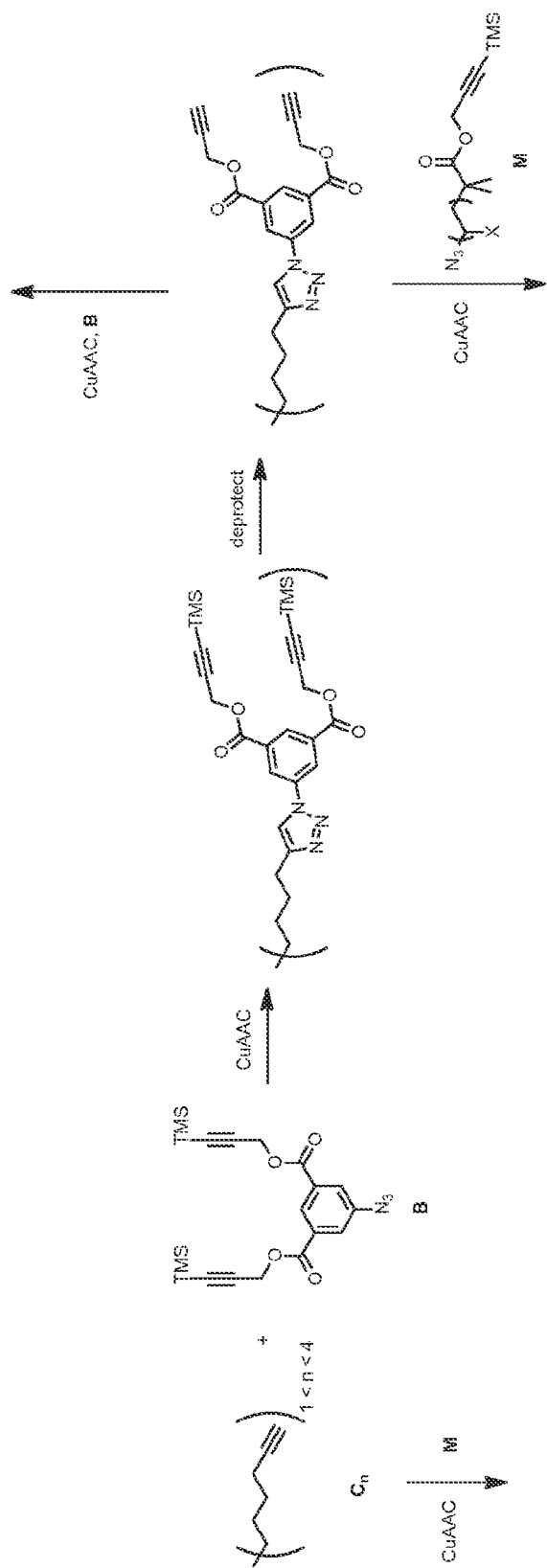
FIG. 23. (a) and (b) Exemplary divergent assembly of dendrimeric structure.
Figure 23B:
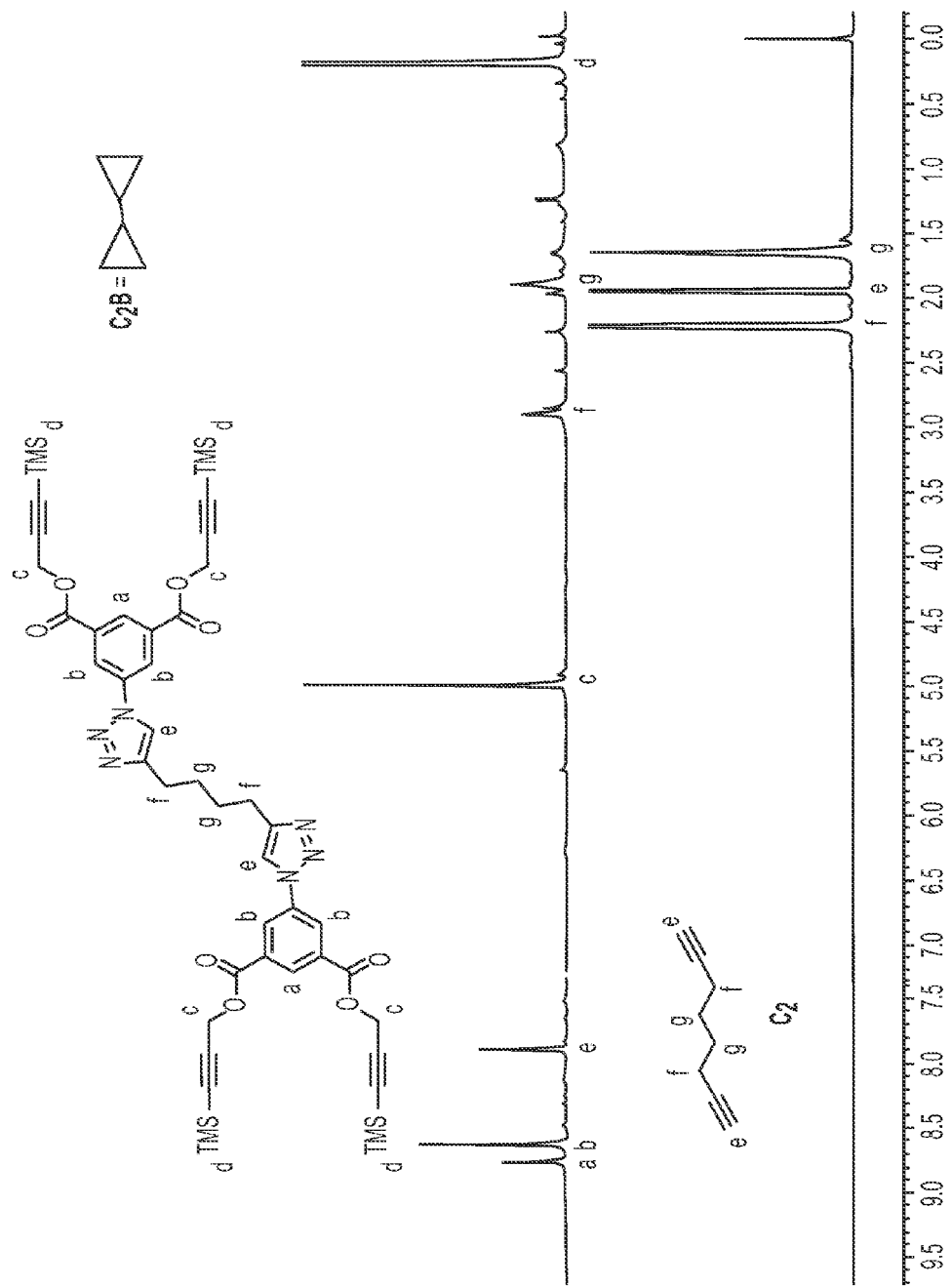

Divergent assembly of an exemplary dendrimeric structure is shown in FIG. 23. A copper catalyzed reaction of either a branch B or a macromolecule M with a polyalkyne core C yields a first generation structure. Deprotection of the terminal silyl groups using potassium carbonate in methanol/dichloromethane regenerates alkynes for subsequent reaction with another branch point B or macromolecule M. The process can be followed by rinsing and repeating to generate more complex structures.

The initial core can be either an organic small molecule (e.g. 1,7-octadiyne as shown) or an alkyne-functionalized nanoparticle (e.g. $SiO_2$, $Fe_3O_4$, etc.) as the strategy is the same regardless of functionality. In some embodiments, alkyne functional magnetic nanoparticles may be used to scavenge extra polymer from the synthesis and centrifugation is used to purify inorganic nanoparticles.

REFERENCES

Blodgett, J. Am. Chem. Soc. 56, 495-495 (1934).
Blodgett, Langmuir, Phys. Rev. 51, 964-982 (1937).
Kuhn and Mobius, Angew. Chem. Int. Ed. Engl. 10, 620-637 (1971).
Decher, Science 277, 1232-1237 (1997).
Decher and Hong, Macromol. Chem., Macromol. Symp. 46, 321-327 (1991).
Stroock et al, Langmuir 19, 2466-2472 (2003).
Wang et al, Langmuir 15, 1360-1363 (1999).

Sukhishvili and Granick, Macromolecules 35, 301-310 (2002).
Baur, et al, Adv. Mater. 10, 1452-1455 (1998).
Wells et al, Langmuir 12, 1989-1996 (1996).
Levaesalmi and McCarthy, Macromolecules 30, 1752-1757 (1997).
Heller, Annu. Rev. Biomed. Eng. 4, 129-153 (2002).
Liang et al, Adv. Funct. Mater. 16, 542-548 (2006).
Vestberg et al, J. Polym. Sci. Polym. Chem. 45, 2835-2846 (2007).
Urbani et al, Macromolecules 41, 76-86 (2008).
Such et al, J. Am. Chem. Soc. 128, 9318-9319 (2006).
De Greest et al, Macromo. Rapid Comm. 29, 1111-1118 (2008).
Kolb et al, Angew. Chem. 40, 2004-2021 (2001).
Binder and Sachsenhofer, Macromol. Rapid Comm. 28, 15-54 (2007).
Wang and Matyjaszewski. Macromolecules 28, 7901-7910 (1995).
White et al, J. Am. Chem. Soc. 128, 11356-11357 (2006).
Troughtoyt et al, J. Am. Chem. Soc. 111, 321-335 (1989)
Netzer and Sagiv, J. Am. Chem. Soc. 105, 674-676 (1983).
Rengifo et al, Langmuir 24, 7450-7456 (2008).
Chen et al, Biomacromolecules 9, 2345-2352 (2008)
Ulman, Chem. Rev. 96, 1553-1574 (1996)
Dubois and Nuzzo, Annu. Rev. Phys. Chem. 43, 437-463 (1992).
Laibinis and Nuzzo, J. Am. Chem. Soc. 113, 7152-7167 (1991).
Senaratne and Andruzzi, C. K. Ober, Biomacromolecules 6, 2427-2448 (2005).
Pantano and Wittberg, Surface and Interfaces Anal. 15, 498-501 (1990).
Dibenedetto, Materials Science and Engineering A302, 74-82 (2001).
Seo et al, J. Org. Chem. 68, 609-612 (2003).
Krivopalov and Shkurko, Russ. Chem. Rev. 74, 339-379 (2005)
Luzinov et al, Macromolecules 33, 1043-1048 (2000).
Jalbert et al, Macromolecules 30, 4481-4490 (1997).
Bates and Frederickson, Physics Today 52, 32-38 (1999).
Jones et al, Polymer 40, 525-530 (1999).
Karim et al, J. Phys. II 5, 1441-1456 (1995).
Ligoure and Leibler, J. Phys. (Paris) 51, 1313-1328 (1990).
Huang et al, Macromolecules 37, 516-523 (2004).
Sun et al, Bioconjugate Chem. 2006, 17, 5257
Such et al, J Am Chem. Soc. 2006 Jul. 26; 128(29):9318-9.
Hu et al. Comptes Rendus Chimie 1631-0748 JAN 2006 9 (1)
Mason et al. The Journal of Adhesion (Print) 81:7-87-8, 765-789
Mason, R et al, Journal of Adhesion 2004, vol. 80 (1-2) 119-143

What is claimed is:

1. A method for generating a dendrimer comprising a heterobifunctional core, a heterobifunctional macromolecule, and a heterotrifunctional branch, the method comprising:
   (a) covalently linking a heterobifunctional core comprised of an α-substituted click moiety group and an ω-substituted click moiety group with a first heterobifunctional macromolecule or a first heterotrifunctional branch, wherein said heterobifunctional macromolecule or heterotrifunctional branch is comprised of a first click moiety group and a first terminus wherein the first terminus is comprised of a second click moiety group or a non-click functional group, and
   (b) covalently linking the heterobifunctional macromolecule or heterotrifunctional branch with a second heterobifunctional macromolecule or heterotrifunctional branch.

2. The method of claim 1, wherein the first terminus is comprised of a second click moiety group.

3. The method of claim 1, wherein the first terminus is comprised of a non-click functional group.

4. The method of claim 3, further comprising a step wherein the non-click functional group is converted to a click moiety group.

5. The method of claim 3, wherein the non-click functional group is selected from the group consisting of alcohol, halide, alkylsulfonate, arylsulfonate, ester and silylether.

6. The method of claim 1, further comprising the step of repeating step (b) until a multilayer dendrimer having (i) a surface layer comprising a surface heterobifunctional macromolecule or heterotrifunctional branch, and (ii) a plurality of heterotrifunctional branches between the surface layer and the core is obtained.

7. The method of claim 1, wherein the first heterobifunctional macromolecule or first heterotrifunctional branch is comprised of a thiol or a terminal alkene.

8. The method of claim 2, wherein the second click moiety group is protected, and further comprising a step between step (a) and step (b) of deprotecting the protected second click moiety group to generate a second click moiety group.

9. The method of claim 1, wherein the macromolecule is comprised of a polymer.

10. The method of claim 1, wherein macromolecule is comprised of a polypeptide, an organic polymer, a polymer precursor, a thermoplastic polymer, a thermosetting polymer, a copolymer, a terpolymer, an oligomer, a homopolymer, a block copolymer, an alternating block copolymer, a random polymer, a random copolymer, a random block copolymer, a graft copolymer, a star block copolymer, a dendrimer or any combination thereof.

11. The method of claim 1, wherein the macromolecule is comprised of a silyl-alkyne-PS-$N_3$, silyl-alkyne-PtBA-$N_3$, silyl-alkyne-PnBA-$N_3$, or silyl-alkyne-PMMA-$N_3$ polymer.

12. The method of claim 9, wherein the polymer is α-alkyne-trimethylsilyl-ω-azide-poly(styrene), α-alkyne-trimethylsilyl-ω-azide-poly(tert-butyl acrylate), α-alkyne-trimethylsilyl-ω-azide-poly(n-butyl acrylate), or α-alkyne-trimethylsilyl-ω-azide-poly(methyl methacrylate).

13. The method of claim 9, wherein the polymer is about 10 Daltons to about 2,000,000 Daltons.

14. The method of claim 8, wherein the first click moiety group is an azide group and the protected second click moiety group is a silylated alkyne group.

15. The method of claim 8, wherein the branch is comprised of a plurality of protected second click moiety groups.

16. The method of claim 8, wherein the branch is comprised of two protected second click moiety groups.

17. The method of claim 1, wherein the core is linked to a nanoparticle.

18. The method of claim 1 wherein the heterobifunctional core is:

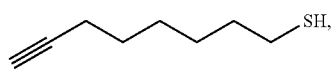

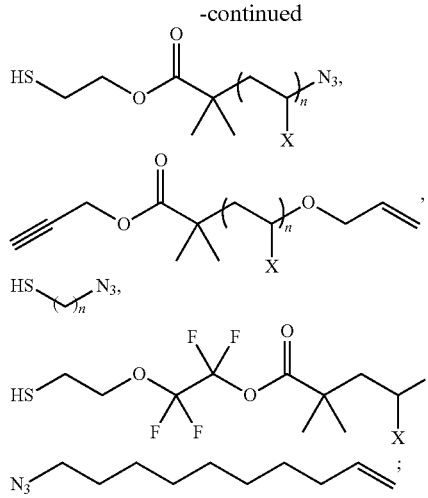
wherein X is hydrogen, alkyl, cycloalkyl, haloalkyl, or halogen; and
wherein n is between about 1 and about 10,000.
19. The method of claim 1, wherein the heterotrifunctional branch is comprised of an alkene and an azide.
20. The method of claim 1, wherein the heterotrifunctional branch is comprised of an azide and a thiol.
* * * * *